(12) United States Patent
Nagase et al.

(10) Patent No.: US 7,490,751 B2
(45) Date of Patent: Feb. 17, 2009

(54) METHOD OF SOLDERING IRON TIP WITH METAL PARTICLE SINTERED MEMBER CONNECTED TO HEAT CONDUCTING CORE

(75) Inventors: Takashi Nagase, Kashia (JP); Takashi Uetani, Hannan (JP); Yoshimoto Teraoka, Sennan (JP); Takanori Naito, Osaka (JP); Norihisa Sekimori, Osaka (JP); Masayuki Miyabe, Osaka (JP)

(73) Assignee: Hakko Corporation, Osaka (JP)

( * ) Notice: Subject to any disclaimer, the term of this patent is extended or adjusted under 35 U.S.C. 154(b) by 673 days.

(21) Appl. No.: 10/785,152

(22) Filed: Feb. 24, 2004

(65) Prior Publication Data

US 2004/0226982 A1    Nov. 18, 2004

Related U.S. Application Data

(63) Continuation of application No. 10/719,001, filed on Nov. 21, 2003, now Pat. No. 7,030,339.

(30) Foreign Application Priority Data

Nov. 26, 2002  (JP) .............................. 2002-342823

(51) Int. Cl.
*B23K 3/02* (2006.01)
(52) U.S. Cl. ........................... 228/51; 228/53; 219/229; 419/8
(58) Field of Classification Search ................. 228/51, 228/53; 219/229, 230, 231, 232, 233, 234, 219/235, 236, 237, 238, 239, 240, 241, 242; 419/8, 9, 26, 29
See application file for complete search history.

(56) References Cited

U.S. PATENT DOCUMENTS

| 29,039 | A | 7/1860 | Patee |
| 53,545 | A | 3/1866 | Trowbridge |
| 62,941 | A | 3/1867 | Crosby |
| 73,798 | A | 1/1868 | Gleason |

(Continued)

FOREIGN PATENT DOCUMENTS

GB    1284994    8/1972

(Continued)

*Primary Examiner*—Kevin P Kerns
*Assistant Examiner*—Michael Aboagye
(74) *Attorney, Agent, or Firm*—Squire, Sanders & Dempsey, L.L.P.

(57) ABSTRACT

A soldering iron tip having a copper or copper alloy core and a metal particle sintered member connected to the core to transfer heat therefrom to form a working soldering tip. The sintered member can be manufactured by powder metallurgy from a base material (iron, nickel and/or cobalt particles) and an additive (silicon, copper, silver, tin, boron and/or carbon particles) where needed. The sintered member can be formed as a cap which is fitted onto the working tip with a silver paste sandwiched therebetween, a brazing filler metal ring is positioned between an abutment shoulder and the cap, flux applied to the joint and the cap brazed into place. A metal, cermet or ceramic coating sprayed on the outer surface of the core, except for the (masked) working tip end, is not wettable by solder. An Ag—Al—Cu alloy coating layer in the rearwardly-disposed cavity improves heat conduction from the heater therein.

46 Claims, 15 Drawing Sheets

U.S. PATENT DOCUMENTS

| | | | |
|---|---|---|---|
| 573,245 A | 12/1896 | Stutz et al. | |
| 1,350,181 A | 8/1920 | Remane | |
| 1,667,618 A | 4/1928 | Abbott | |
| 2,213,438 A | 9/1940 | Young | |
| 2,679,223 A | 5/1954 | Franklin | |
| 3,006,069 A * | 10/1961 | Rhoads et al. | 228/124.1 |
| 3,245,599 A | 4/1966 | Johnson | |
| 3,315,350 A * | 4/1967 | Kent | 205/149 |
| 3,358,897 A | 12/1967 | Christensen | |
| 3,646,577 A | 2/1972 | Ernst | |
| 3,876,857 A | 4/1975 | Dhillon | |
| 3,894,678 A * | 7/1975 | Pietrocini et al. | 228/207 |
| 3,899,114 A * | 8/1975 | Kleeberg | 228/55 |
| 3,919,524 A | 11/1975 | Fortune | |
| 3,941,299 A | 3/1976 | Godfrey | |
| 4,023,724 A | 5/1977 | Wakita et al. | |
| 4,052,531 A * | 10/1977 | Steine et al. | 428/673 |
| 4,187,972 A | 2/1980 | Vella | |
| 4,345,136 A * | 8/1982 | Nippert | 219/120 |
| 4,560,101 A | 12/1985 | Wilhelmson et al. | |
| 4,568,819 A | 2/1986 | Stacconi | |
| 4,903,884 A | 2/1990 | Royston et al. | |
| 4,974,768 A * | 12/1990 | Ebata | 228/54 |
| 4,995,921 A * | 2/1991 | Davis et al. | 148/22 |
| 5,059,769 A | 10/1991 | Fortune | |
| 5,062,564 A | 11/1991 | Urban | |
| 5,122,637 A | 6/1992 | Bottorff et al. | |
| 5,329,085 A | 7/1994 | Cowell et al. | |
| 5,553,767 A * | 9/1996 | Weller | 228/54 |
| 5,572,119 A | 11/1996 | Taylor | |
| 5,579,533 A | 11/1996 | Weller | |
| 5,770,835 A | 6/1998 | Sakuyama et al. | |
| 5,997,248 A * | 12/1999 | Ghasripoor et al. | 415/173.4 |
| 6,019,270 A | 2/2000 | Boll et al. | |
| 6,039,237 A | 3/2000 | Nakajima et al. | |
| 6,054,678 A | 4/2000 | Miyazaki | |
| 6,215,104 B1 | 4/2001 | Kurpiela et al. | |
| 6,386,423 B1 | 5/2002 | Adler et al. | |
| 6,652,175 B2 | 11/2003 | Chang | |
| 6,710,304 B2 | 3/2004 | Yokoo | |
| 6,818,862 B2 | 11/2004 | Uetani et al. | |
| 2004/0232132 A1 | 11/2004 | Masaki | |
| 2006/0022018 A1 | 2/2006 | Yoshimura et al. | |

FOREIGN PATENT DOCUMENTS

| | | |
|---|---|---|
| JP | 54-161509 | 12/1979 |
| JP | 61001230 | 1/1986 |
| JP | 2000288723 | 1/2000 |
| JP | 2000317629 | 11/2000 |
| JP | 2001-071127 | 3/2001 |
| WO | WO 97/26108 | 7/1997 |

* cited by examiner

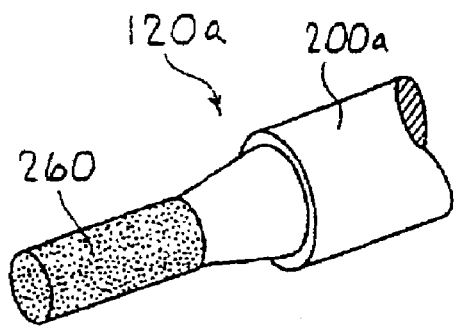
FIG. 8(a)
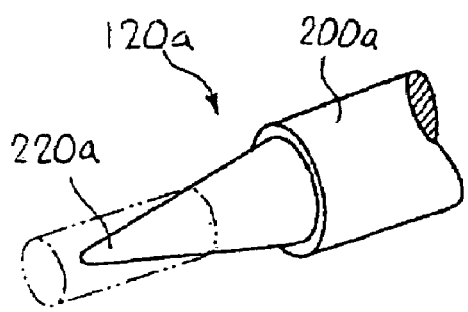
FIG. 8(b)
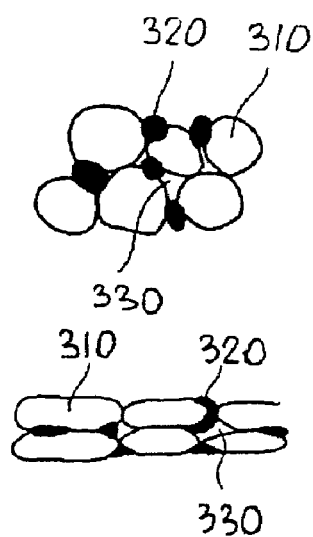
FIG. 9(a)
FIG. 9(b)
FIG. 9(c)

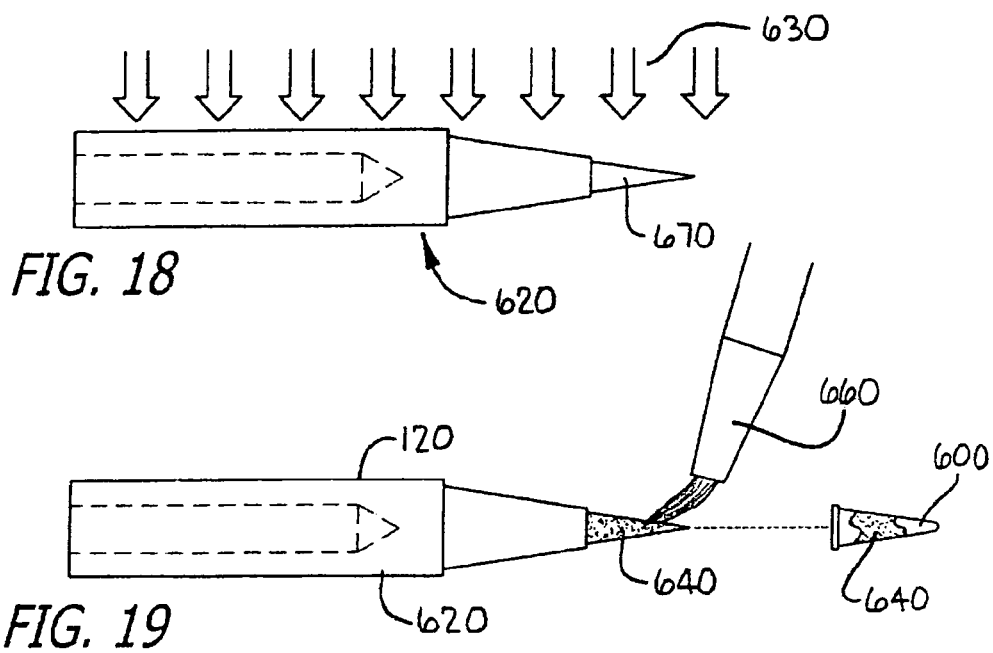
FIG. 18
FIG. 19
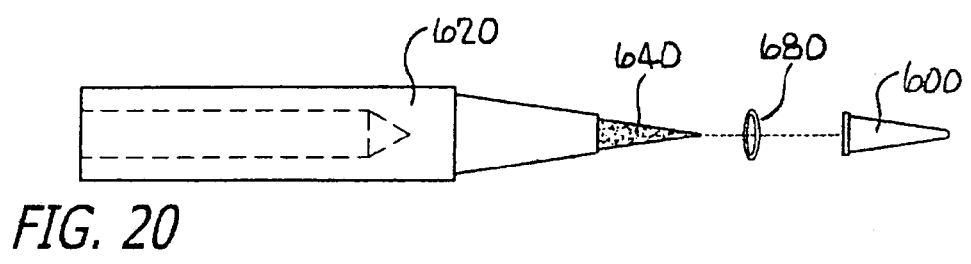
FIG. 20
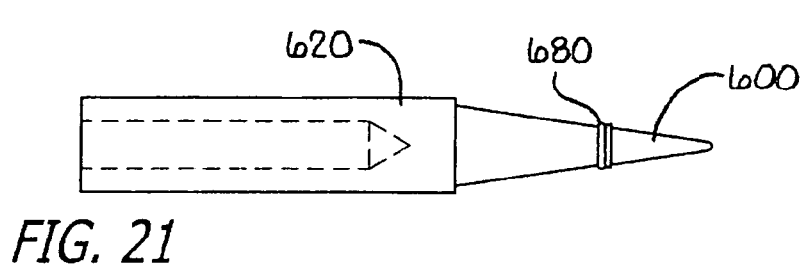
FIG. 21
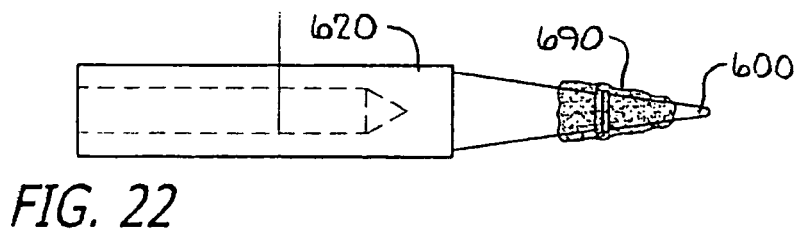
FIG. 22

METHOD OF SOLDERING IRON TIP WITH METAL PARTICLE SINTERED MEMBER CONNECTED TO HEAT CONDUCTING CORE

This is a continuation of U.S. patent application Ser. No. 10/719,001, filed Nov. 21, 2003, now U.S. Pat. No. 7,030,339, the entire contents of which application are hereby incorporated by reference, and which claims priority to Japanese Patent No. 2002-342823, filed Nov. 26, 2002.

BACKGROUND OF THE INVENTION

The present invention relates to soldering iron tips for electric soldering tools and for desoldering tools. It further relates to methods of manufacturing soldering iron tips.

Soldering is a method for connecting and bonding components and especially in the electronics industry. Soldering can be roughly classified into two categories, namely, mass soldering (batch soldering) and manual soldering. Mass soldering includes flow soldering mounting elements or components on a printed circuit board and then immersing the board in a molten solder bath. Mass soldering further includes reflow soldering (SMT) wherein soldered particles and flux are mixed with a binder or additive to form a solder paste. The solder paste is printed on the circuit board, and the elements are then mounted on the circuit board and heated so as to solder them. Both of these methods allow simultaneous soldering of multiple points.

Manual soldering using an electric soldering iron allows generally any user to easily perform soldering operations. Manual soldering can be used following the mass soldering methods described above, to repair localized defective soldering, or to solder parts which could not be soldered with the mass soldering methods.

Conventional soldering iron tips for electric soldering irons are made of copper or copper alloys and their forward ends are iron plated with a thickness of several tens micrometers to several hundreds micrometers in order to prevent solder corrosion. This plated area is then coated with solder, and soldering operations are performed therewith. In the past it was common for the principal components of solder to be tin and lead (Sn—Pb solders of which Sn—Pb eutectic solder is representative thereof. However, in recent years due to environmental concerns, lead is less commonly used and so-called lead-free solders have been more frequently used. Examples of lead-free solders are Sn—Cu solders, Sn—Ag solders, and Sn—Ag—Cu solders.

As compared to Sn—Pb solders, it is more difficult to achieve good solder joints with lead-free solders, due to inferior solder wetting and ease of solder spreading. The primary causes of inferior solder wetting include the facts that the melting points are 20 to 45° C. higher than Sn—Pb solders and the tips of the soldering irons are more readily oxidized. Consequently, soldering work using manual soldering methods has suffered. Soldering defects are likely to result with manual soldering which uses lead-free solder and thereby more frequent repairs are required. The present applicants have invented technology for improving soldering performance while maintaining substantially the same degree of solder corrosion of the soldering iron tip as with iron plated articles. This is described in patent document A JP-2000-317629, entitled "Soldering Iron Tip" and filed on May 10, 1999, the entire contents of which are hereby incorporated by reference. As described in this document, instead of conventional iron plating, an Fe—Ni alloy plating is used at the forward end of the soldering iron tip, or an Fe—Ni alloy covering member (a bulk material) is provided to improve soldering performance.

Furthermore, soldering related operations include desoldering wherein (electric) solder suction devices are used to remove undesired solder. These devices have a suction nozzle that is heated such as by a built-in heater, and the end of the heated suction nozzle is contacted with the solder to thereby melt it. The molten solder is suctioned into the interior of the desoldering tool through an opening at the end of the suction nozzle. The suctioning is performed by a vacuum pump or the like, and the molten solder is stored in a tank (or a capsule) having a filter provided in the suction passageway thereto.

With respect to the function of melting solder when the heated tip contacts it and the requirements of good solder wetting in order to maintain good heat transfer characteristics, the suction nozzle of the electric solder suction device is similar to the soldering iron tip of an electric soldering iron, and similar iron plating is typically used at the forward end thereof. Similar to the soldering iron tip of the electric soldering iron, desoldering tip corrosion is to be prevented while maintaining solder wettability, even when using lead-free solder.

SUMMARY OF THE INVENTION

"Soldering iron tip" as used in this disclosure refers to both the soldering iron tips of electrical soldering tools and soldering iron suction nozzles of desoldering tools. The Fe—Ni alloy plating described above provides some extension of the working life of the soldering iron tip. However, the working life of the tips is limited by the progressive loss of solder wettability; that is, the working life of soldering iron tips is limited by oxidation of the forward end thereof due to solder corrosion. The working life limit due to solder corrosion is the same as that for iron plated articles. For reasons such as the fact that the melting point of lead-free solder is higher than that of Sn—Pb solders, lead-free solders have greater corrosion of the soldering iron tip. Consequently, the working life of the tips is reduced due to the increased corrosion when lead-free solders are used. Increasing the thickness of the plating by increasing the length of the time during which the Fe—Ni alloy plating is performed disadvantageously further increases the plating processing time, which without the thicker plating takes twenty to thirty hours. In addition to the reduced productivity, increased cost can be expected due to the cost of processing environmental contaminants in the plating waste.

Although providing an Fe—Ni alloy coating member (bulk material) at the forward end of the soldering iron tip reduces corrosion, other problems result. In general, solder wettability varies inversely with corrosion resistance, and these characteristics are strongly influenced by the properties of the solder and the properties of the soldering iron tip. Accordingly, the properties of the solder and of the soldering iron tip must be considered when finding a balance between solder wettability and corrosion resistance. Conventionally, almost all Sn—Pb solders were Sn—Pb eutectic solders, but lead-free solders include the various different types mentioned above. Consequently, problems arise when an Fe—Ni alloy coating member is provided at the forward end of a soldering iron tip since the characteristics thereof vary according to the type of solder used. Selecting optimal physical characteristics to correspond to the type of solder used results in limited options and inability to achieve a satisfactory result.

Accordingly, an object of the present invention is to provide a soldering iron tip (and method of manufacturing the same) wherein the soldering iron tip has improved solder corrosion resistance, improved soldering performance or removal characteristics, while readily allowing for optimization of the properties of the soldering iron forward end according to the type of solder, and reduced discharge of environmental contaminants.

An invention of the present disclosure is a soldering iron tip for handling solder wherein the soldering iron tip is used for an electric soldering iron or an electric desoldering suction tool. The soldering iron tip has a metal particle sintered member at the forward end of the soldering iron tip core. The sintered member can be manufactured by powder metal metallurgy, and the material of the core is preferably copper or copper alloy. Manufacturing by powder metallurgy provides freedom in shaping the member and makes it possible to manufacture the member with a shape close to that of the final desired shape, whereby subsequent grinding (shape finishing) operations are reduced if not eliminated. Furthermore, as compared with solution processes, it is not necessary to heat the sintered member to the melting point of iron. Thereby energy consumption is reduced and environmental impact is lessened. Discharge processing, which was used with conventional iron plating, is no longer needed and the negative impact on the environment is lessened allowing for energy saving and mass production.

The metal particle sintered body or member can comprise a sintering base material, or a sintering base material and a sintering additive, wherein the sintering base material includes iron, nickel and/or cobalt particles. By using a sintered alloy having as its primary components iron, nickel and/or cobalt (which are elements from the same group having similar properties to iron), or a combination thereof, a soldering iron tip can be produced having good resistance to solder corrosion and good solder wettability. In particular, when the sintering materials are based on iron particles to which nickel particles and cobalt particles are added, improved corrosion resistance and solder wettability as compared with iron particles alone can be obtained.

The above-mentioned iron particles used for the sintering base material can be iron powder having a purity of no less than 99.5%. Losses in thermal and electrical conduction and inferior soldering application characteristics or soldering removal characteristics due to impurities are thereby avoided. On the other hand, the density of the metal particle sintered body or member is advantageously increased. If the iron particles contain large quantities of impurities, such as carbon, oxygen, nitrogen or hydrogen, the corresponding density of the metal particle sintered member should be no greater than 90%; while if high purity iron particles are used, the density is increased to no less than 96%.

The sintering base material in the metal particle sintered body or member can be between 60% and 99.99%. This allows the properties of the sintering base material, which serves as the primary component, to be effectively used. Solder corrosion resistance and solder wettability are thereby significantly improved.

The metal particle sintered body can comprise a sintering base material and a sintering additive wherein the additive is selected from the group of copper particles, silver particles, tin particles, boron particles and carbon particles. This allows not only for further improved soldering performance but also for a high density metal particle sintered body or member to be produced by sintering at relatively low temperatures and for the body or member to have good corrosion resistance. Copper, silver and tin have relatively low melting points, namely 1,083° C., 961° C., and 232° C., respectively, and can be used. Thus, even if the sintering temperature is set to a relatively low temperature, these particles melt in the sintering process, allowing liquid phase sintering, which fills in the gaps between the particles. In solid phase sintering, boron is interstitially diffused among the iron group elements, furthering mutual diffusion of the solids within each other, allowing sintering at a relatively low temperature of 1,100° C. Carbon when included can improve the solder corrosion resistance and significantly extends the working life of the tip.

The content of the sintering additive in the metal particle sintered body or member can be between 0.01% and 40%. Thereby, it is possible to establish the optimal amount to be added without the amount of the sintering additive being too small and its effect being insufficient and without being too large, resulting in defects. The soldering iron tip for handling solder and having the metal particle sintered member connected to the core as discussed above can be used as a replaceable soldering iron tip on a main body provided with a heating element. Alternatively, the tip can be provided as a replaceable suction nozzle on a main body similarly provided with a heating element and also with a vacuum function. If the electric soldering iron or the electric desolder tool is thereby produced, it is possible to reduce the number of times that the soldering iron tip is replaced when applying or removing lead-free solder. Additionally, this construction provides for increased workability and also facilitates high quality soldering and solder removal even by people who are not highly skilled.

In addition to the soldering iron tip construction, another invention herein is the method of manufacturing of soldering iron tips for handling solder. The sintering base material or the sintering base material and the sintering additive, can be mixed with a binder. Examples of binders are approximately 40 volume %, in an amount of the mixture of sintering materials and binders. A shape substantially the same as the desired soldering iron member or a shape encompassing the same thereof, is formed as a green compact by pressure molding. The green compact is fired in a non-oxidative (an inert gas) atmosphere at 800 to 1,300° C. to produce the desired metal particle sintered member. This member is then joined to the forward end of the soldering iron tip core, which preferably is a copper or a copper alloy. The metal particle sintered body or member can then be machined to the desired shape, and subsequently joined to the forward end of the soldering iron core by brazing or the like.

A step in the manufacturing process of the metal particle sintered body or member is to further shape it by preform forging or powder forging at temperatures of 300 to 500° C. to produce the soldering iron forward member. This reduces the fine air cavities between the particles and the metal particle sintered body, thereby increasing the density and improving corrosion resistance.

A further definition of the present manufacturing method invention is that the sintering base material (or the sintering base material and additive), are mixed with a binder and pressure molded to a green compact having a shape substantially the same as that of the desired soldering iron forward member end product or a shape encompassing the shape of the soldering iron forward end member. The molded shape is fired in a non-oxidative atmosphere at no less than 800° C. and no greater than the melting point of the soldering iron tip core to thereby produce the soldering iron forward end member comprising the metal particle sintered body, while joining the soldering iron forward end member to the forward end of the soldering iron core. Pursuant to this manufacturing process, there is no need for joining the soldering iron tip core and the soldering iron forward end member by brazing or the like, and manufacturing productivity can thereby be increased.

Further, instead of pressure molding, injection molding methods can be used to form the soldering iron tip. In this manner, a green compact can be easily shaped, even for relatively complex shapes which are difficult to make by compression molding. The need for subsequent machining is thereby reduced or eliminated and manufacturing productivity increased.

Liquid phase sintering can alternatively be used according to the present invention. Liquid phase sintering includes the firing temperatures being no less than the melting point of the sintering additive. This allows for high density metal particle sintered bodies or members to be produced by sintering at a relatively low temperature. In other words, with liquid phase sintering, the particles having a lower melting point, melt in the sintering process and fill in the gaps between the metal particles. Thereby, a high density metal particle sintered body can be produced, allowing for excellent solder application characteristics and solder removal characteristics. A power savings is also achieved since the sintering is at relatively low temperatures.

A further definition of the invention is a manufacturing method characterized in that the metal particle sintered body or member is produced from a sintering base material or a sintering base material and a sintering additive, by cold isostatic pressure compression molding, hot isostatic press compression molding, or mechanical alloying. The metal particle sintered body is plastically worked into a rod shape or a filament shape. This shape is further machined to produce a soldering iron forward member, and this soldering iron forward member is joined to the forward end of a soldering iron core. This process allows for the fine air cavities between particles and the metal particle sintered body to be reduced thereby increasing the density of the body, and providing high corrosion resistance.

Another method of manufacturing a soldering iron tip of the present invention includes alloying the sintering base material and the sintering additive by a solution process and granulating the particles to produce an alloy particle. The metal particle mixing process thereby can be simplified, increasing manufacturing productivity.

A further manufacturing method of the invention is characterized in that the particle size of the sintering base material, the sintering additive or the alloy particle used is no greater than 200 µm. Alternatively, the particles used can be no greater than 50 µm. Even further, ultra-fine particles can be used as the sintering base material, the sintering additive or the alloy particle. By using small metal particles, the density of the metal particle sintered body can be increased. Additionally, it is possible to improve the solder application characteristics or the solder removal characteristics, and to improve the corrosion resistance of the soldering iron tip.

However, it is difficult to form a tip cap whose thickness is less than approximately 1000 microns using pressing or extruding processes. Also, the density of caps formed using these methods will generally be ninety percent or less. Therefore, it is preferable to use metal injection molding to form the tip cap of this invention. Using this method, the tip caps can have a wall thickness of 200 to 800 microns and a density after sintering of 96 to 97%.

Further inventions of the present disclosure are set forth in the paragraphs below.

A method of forming a soldering iron tip, comprising: providing a copper or copper alloy core having a base portion and a forward extension portion, the forward tip portion having a tip end; applying Ag particles to at least one of an inside surface of a solder tip cap and the forward tip portion; after the applying, fitting the solder tip cap on the forward tip portion; and after the fitting, brazing the cap to the forward tip portion.

The method defined above wherein the applying Ag particles includes applying the particles in a paste which includes alcohol.

The method defined above wherein the applying includes the Ag particles have a size of between 0.1 µm and 50 µm.

The method defined above where the applying includes brushing the paste onto the inside surface and the forward tip portion.

The method defined above wherein the brazing is in a furnace.

The method defined above wherein the furnace is filled with $N_2$ gas and has a brazing temperature of 700° C.

The method defined above further comprising before the brazing and the fitting, mounting a brazing filler metal ring to the forward extension portion.

The method defined above wherein the ring is a BAg-7 ring.

The method defined above further comprising applying flux on a joint between the cap and the forward extension portion.

The method defined above wherein the flux applying is before the brazing.

The method defined above wherein the flux is a silver brazing flux.

The method defined above wherein the brazing is in a non-oxidation atmosphere.

The method defined above wherein the cap is an iron cap.

A soldering iron tip formed by any of the methods defined above.

A method of forming a soldering iron tip, comprising: applying a paste of Ag particles to at least one of an inside surface of a soldering iron tip cap or a forward tip of an extension member of a soldering iron tip core; after the applying, inserting the cap on the forward tip end; and after the applying, subjecting the cap and the extension member to a brazing temperature.

The method defined above wherein the applying applies approximately 500 milligrams of Ag particles.

The method defined above wherein the cap is a metal-injection-molded cap.

The method defined above wherein the cap is an iron cap.

The method defined above wherein the diameters of the Ag particles are between 0.1 µm and 50 µm.

The method defined above further comprising before the subjecting, mounting a brazing filler metal ring on the extension member.

The method defined above wherein the mounting is before the inserting.

The method defined above further comprising wherein the mounting is against an abutment surface of the extension member.

The method defined above wherein the abutment surface extends out perpendicular to a longitudinal axis of the extension member.

The method defined above wherein the abutment surface extends out an angle from a longitudinal axis of the extension member away from the forward tip.

The method defined above wherein the ring is a silver braze ring.

The method defined above further comprising after the mounting, applying flux over the ring.

The method defined above wherein the applying flux is before the subjecting.

The method defined above wherein the flux is AWS 3A type or AWS 3B type flux.

The method defined above wherein the subjecting is in a furnace, at approximately 700° C. for approximately 10 minutes.

The method defined above where the furnace is filled with at least one of the gases selected from the group consisting essentially of $N_2$, $H_2$ and Ar gas.

The method defined above further comprising applying flux to a joint between the cap and the extension member.

The method defined above wherein the flux is a silver brazing flux.

The method defined above wherein the applying applies the paste to both the inside surface and the forward tip end.

The method defined above further comprising applying flux to the joint between the cap and the extension member, and the subjecting includes heating in an inert atmosphere.

The method defined above wherein the inserting includes pressure fitting the cap on the forward tip end.

The method defined above wherein the cap is an iron cap.

A soldering iron tip formed by any of the methods defined above.

A soldering iron tip comprising: a copper or copper alloy core having a base portion and a forward extension portion; and an iron cap brazed to a tip end of the forward tip portion with a silver particle layer sandwiched between the cap and the forward extension portion.

The soldering iron tip defined above further comprising silver-based brazing filler in the joint between the end of the cap and the forward extension portion.

The soldering iron tip defined above wherein the soldering iron tip defines a solder suction tip and the forward extension portion has a suction through-passageway.

The soldering iron tip defined above wherein the cap is a metal-injection-molded cap.

The soldering iron tip defined above further comprising a brazing filler metal ring on and brazed to the extension member between an abutment surface of the extension member and a proximal end of the cap.

The soldering iron tip defined above wherein the abutment surface is perpendicular to a longitudinal axis of the extension member.

The soldering iron tip defined above wherein the abutment surface is at an angle of approximately 5 to 10 degrees relative to a longitudinal axis of the extension member and away from the forward tip.

A method of making a soldering iron tip, comprising: providing a soldering iron tip core which includes a base portion and a forward extension portion; masking a working tip end of the extension portion; and with the working tip end masked, plasma spraying a top coating on the core.

The method defined above wherein the plasma spraying includes spinning the core about a longitudinal axis thereof while spraying the top coating on the core.

The method defined above wherein the spraying is out a nozzle, and the spraying includes moving the nozzle back and forth along the core as the core is spinning.

The method defined above wherein the nozzle during the spraying is about 100 millimeters away from the soldering iron tip and the moving back and forth is for several cycles.

The method defined above wherein the temperature in the nozzle is 1,000 to 10,000° C.

The method defined above wherein the top coating is approximately 60 µm layer of SUS316L high-purity stainless steel.

The method defined above further comprising before the spraying, roughening the outer surface of the core.

The method defined above wherein the roughening includes steel grit blasting the outer surface.

The method defined above wherein the roughening includes air blast cleaning the surface after the steel grit blasting.

The method defined above wherein the steel grit blasting includes blasting steel grit particles having diameters of between 10 to 250 µm, with an average diameter of about 80 µm and a 10 Morse hardness, the output of the blasting is 3.7 to 4.0 kgf/cm$^2$, and the blasting is for about 10 seconds.

The method defined above wherein the masking uses a heat-resistant rubber mask.

The method defined above wherein the extension portion is tapered and the working tip end is only a forward portion of the tapered extension portion, approximately 35% of the total length of the tapered extension portion.

The method defined above wherein the working tip end includes a metal-injection-molded cap.

The method defined above wherein the working tip end includes a plating layer of tin or tin alloy.

The method defined above further comprising before the plasma spraying, applying an undercoating to the core.

The method defined above wherein the undercoating is applied by plasma spraying.

The method defined above wherein the top coating is a ceramic material or a cermet material.

The method defined above wherein the undercoating is Ni-20% Cr.

The method defined above wherein the undercoating has a heat expansion rate that is greater than that of the top coating and less than that of the material of the core.

The method defined above wherein the undercoating is Ni, Co 23%, Cr 17%, Al 2%, Y 0.5%.

The method defined above wherein the undercoating is Co, Ni 32%, Cr 21%, Al 8%, Y 0.5%.

The method defined above further comprising applying a sealing coating on the top coating.

The method defined above wherein the sealing coating is $Cr_2O_3$, $SiO_2$ or $ZrO_2$.

The method defined above wherein the sealing coating is applied by brushing or by dipping.

The method defined above further comprising hardening the sealing coating by heating after the applying.

The method defined above wherein the heating is for approximately 30 minutes at approximately 180° C.

The method defined above wherein the top coating is Mo.

The method defined above wherein the top coating is Al, Ni, Cu, W, or Ti.

The method defined above wherein the top coating is Ti.

The method defined above wherein the top coating is a ceramic material or a cermet material.

The method defined above further comprising after the plasma spraying, removing the mask.

The method defined above wherein after the removing, the working tip end has a wettability by solder and the rest of the extension portion does not have a wettability by solder.

The method defined above wherein the core is copper or a copper alloy.

The method defined above wherein the soldering iron tip is for a desoldering tool and the core has a longitudinal suction through-passageway.

A soldering iron tip manufactured by any of the methods defined above.

The soldering iron tip defined above wherein the soldering iron tip comprises a desoldering tool nozzle.

A method of forming a soldering iron tip, comprising: providing a soldering iron tip core having a base portion and a forward extension portion; masking a working tip end of the extension portion; with the working tip end masked, applying an undercoating on the core; with the working tip end masked, spraying a ceramic cermet or metal top coating on the undercoating; and applying a sealant on the top coating.

The method defined above wherein the applying the sealant is with the working tip end masked.

A soldering iron tip formed by the methods defined above.

A soldering iron tip comprising: a heat-conducting core having a base portion and a forward extension portion; and a top coating on the base portion and on the extension portion but not on a working tip end thereof, the top coating not being wettable by solder.

The soldering iron tip defined above wherein the tin or tin alloy coated working tip end has a wettability by solder.

The soldering iron tip defined above wherein the top coating is an approximately 60 μm layer of SUS316L high-purity stainless steel.

The soldering iron tip defined above wherein the extension portion is conical.

The soldering iron tip defined above wherein the core comprises copper or copper alloy.

The soldering iron tip defined above wherein the working tip end includes a plating layer of tin or tin alloy.

The soldering iron tip defined above further comprising an undercoating on the core underneath the top coating.

The soldering iron tip defined above wherein the undercoating has a thickness of approximately 30 μm.

The soldering iron tip defined above wherein the top coating is a ceramic material, a cermet material, or a metal.

The soldering iron tip defined above wherein the undercoating is Ni-20% Cr.

The soldering iron tip defined above wherein the undercoating has a heat expansion rate that is greater than that of the top coating and less than that of the material of the core.

The soldering iron tip defined above wherein the undercoating is Ni, Co23%, Cr17%, Al 2%, Y0.5%.

The soldering iron tip defined above wherein the undercoating is Co, Ni32%, Cr21%, Al 8%, Y0.5%.

The soldering iron tip defined above further comprising a sealing coating on the top coating.

The soldering iron tip defined above wherein the sealing coating is $Cr_2O_3$, $SiO_2$ or $ZrO_2$.

The soldering iron tip defined above wherein the sealing coating has a thickness of between 1 and 100 μm.

The soldering iron tip defined above wherein the sealing coating is a heat-hardened sealing coating.

The soldering iron tip defined above wherein the top coating is Mo.

The soldering iron tip defined above wherein the top coating is Al, Ni, Cu, W, or Ti.

The soldering iron tip defined above wherein the top coating is Ti.

The soldering iron tip defined above wherein the core has a rearwardly-opening cavity adapted to receive a bar-shaped heater therein.

The soldering iron tip defined above wherein the soldering iron tip is for a desoldering tool and the core has a longitudinal suction through-passageway.

The soldering iron tip defined above including a metal-injection-molded cap at the working tip end.

The soldering iron tip defined above wherein the cap is brazed to the core with a silver particle paste sandwiched between the cap and the forward extension position.

The soldering iron tip defined above wherein the forward extension portion has a total length of between 0.5 and 2.5 cm and the working tip end has a length of between 0.1 and 1.0 cm.

The soldering iron tip defined above wherein the forward extension portion has a total length of approximately 1.7 cm and the working tip end has a length of approximately 0.6 cm.

The soldering iron tip defined above further comprising an undercoating underneath the top coating and a sealant on the top coating.

The soldering iron tip defined above wherein the sealant has a thickness of approximately 50 μm, the top coating has a thickness of approximately 60 μm and the undercoating has a thickness of approximately 30 μm.

The soldering iron tip defined above wherein the top coating comprises ceramic, cermet or metal.

A method of forming a soldering iron tip, comprising: providing a copper or copper alloy core having a base portion and a forward working end portion, the base portion having a rearwardly-opening cavity; applying a paste which includes Al and Ag particles in the cavity; and after the applying, heating the paste to form an Ag—Al—Cu alloy coating layer in the cavity.

The method defined above wherein the applying includes applying a 2 to 5 mg/cm$^2$ layer of the paste to surfaces of the cavity.

The method defined above wherein the alloy of the alloy coating layer is a eutectic composition of Ag-29.5% Al by weight % and having a eutectic temperature of 566° C.

The method defined above wherein the applying is by brushing the paste or by dipping in the paste.

The method defined above wherein the paste includes 10-60 weight % Al particles and 40-90 weight % Ag particles.

The method defined above wherein the paste includes alcohol.

The method defined above wherein the alcohol is Methyl alcohol, Ethyl alcohol, Butyl alcohol, Isopropyl alcohol or another higher solvent alcohol.

The method defined above wherein the paste further includes Glycerine or Propylene glycol.

The method defined above further comprising after the applying and before the heating, allowing the paste to dry at a temperature lower than 400° C.

The method defined above wherein the heating is in an inert atmosphere at a temperature and for a period of time sufficient to melt the paste.

The method defined above wherein the temperature is less than 750° C.

The method defined above wherein the period of time is approximately 10 minutes.

The method defined above wherein the temperature is approximately 700° C.

The method defined above wherein the coating layer has a thickness of between 5 and 50 μm.

The method defined above wherein the thickness is 40 μm.

The method defined above wherein the paste of Al and Ag particles is a mixture of 30% Al particles and 70% Ag particles.

The method defined above wherein the paste includes the Al and Ag particles and a binder.

The method defined above wherein the binder is alcohol.

The method defined above wherein the coating layer has an $Al_2O_3$ surface film.

The method defined above wherein the particles have diameters of between 1 μm and 50 μm.

The method defined above wherein the particles have an oxygen content of 1% by weight or less.

The method defined above wherein the coating layer has a high Al concentration.

The method defined above wherein the Al concentration is more than 5% by weight.

The method defined above wherein the soldering iron tip is for a desoldering tool and has a longitudinal suction through-passageway.

The method defined above wherein the cavity is adapted to receive a bar-shaped heater therein.

The method defined above wherein the working end portion has a solder suction through-passage.

The method defined above wherein the layer coats the entire surface of the cavity.

The method defined above wherein the cavity has a cylindrical shape.

The method defined above wherein the opening of the cavity has a hexagonal shape.

The method defined above further comprising before the applying, forming the paste by mixing the Al and Ag particles and an alcohol binder.

The method defined above wherein the forward working end portion has a conical shape, a screwdriver shape, or a knife shape.

The method defined above further comprising after the heating, plasma spray coating an outside surface of the core with ceramic, cermet or metal.

The method defined above further comprising joining a metal-injection-molded cap to the forward working end portion.

The method defined above wherein the joining is before or at the same time as the heating.

The method defined above wherein the joining includes applying a silver particle paste between the cap and the forward working end portion, and after the applying brazing the cap in place.

A soldering iron tip made by the methods defined above.

A method of forming a soldering iron tip, comprising: providing a copper or copper alloy core having a base portion and a forward working end portion, the base portion having a rearwardly-opening cavity; and forming an aluminum oxide film in the cavity.

A soldering iron tip made by the method defined above.

A soldering iron tip, comprising: a copper or copper alloy core having a base portion and a forward working end portion, the base portion having a rearwardly-opening cavity; and an Ag—Al—Cu alloy coating layer in the cavity.

The soldering iron tip defined above wherein the alloy of the coating layer is a eutectic composition of Ag-29.5% Al by weight % and having a eutectic temperature of 566° C.

The soldering iron tip defined above wherein the coating layer has a thickness of between 5 and 50 μm.

The soldering iron tip defined above wherein the thickness is 40 μm.

The soldering iron tip defined above wherein the coating layer has an Al$_2$O$_3$ surface film.

The soldering iron tip defined above wherein the coating layer has a high Al concentration.

The soldering iron tip defined above wherein the Al concentration is more than 5% by weight.

The soldering iron tip defined above wherein the soldering iron tip is for a desoldering tool and has a longitudinal suction through-passageway.

The soldering iron tip defined above wherein the cavity is adapted to receive a bar-shaped heater therein.

The soldering iron tip defined above wherein the working end portion has a solder suction through-passageway.

The soldering iron tip defined above wherein the layer coats the entire surface of the cavity.

The soldering iron tip defined above wherein the cavity has a cylindrical shape.

The soldering iron tip defined above wherein the opening of the cavity has a hexagonal shape.

The soldering iron tip defined above wherein the forward working end portion has a conical shape, a screwdriver shape, or a knife shape.

The soldering iron tip defined above further comprising a coating of ceramic, cermet or metal on an outside surface of the core.

The soldering iron tip defined above further comprising a metal-injection-molded cap joined to the forward working end portion.

The soldering iron tip defined above wherein the cap is brazed to the forward working end portion with a silver particle paste layer therebetween.

A soldering iron tip comprising: a copper or copper alloy core having a base portion and a forward working end portion, the base portion having a rearwardly-opening cavity; and an aluminum oxide film in the cavity.

The soldering iron tip defined above wherein the aluminum oxide film has a thickness of approximately 0.1 μm or less.

The soldering iron tip defined above wherein the film coats the entire surface of the cavity.

The soldering iron tip defined above further comprising a coating of ceramic, cermet or metal on an outside surface of the core.

The soldering iron tip defined above further comprising a metal-injection-molded cap joined to the forward working end portion.

In other words, disclosed herein is a soldering iron tip including a copper or copper alloy core, the core having a base portion, a forwardly extending portion and a rearwardly-disposed cavity. The soldering iron tip has one or more of the following: (1) a metal particle sintered member connected to the core to transfer heat therefrom to form a working soldering tip (the sintered member can be manufactured by powder metallurgy from a base material (iron, nickel and/or cobalt particles) and an additive (silicon, copper, silver, tin, boron and/or carbon particles) where needed); (2) a cap (which can be the above-described sintered member) fitted onto the working tip of the forwardly extending portion with a silver paste sandwiched therebetween, a brazing filler metal ring is positioned between an abutment shoulder and the cap, flux applied to the joint and the cap brazed into place; (3) a metal, cermet or ceramic coating sprayed on the outer surface of the core, except for the (masked) working tip end, and which is not wettable by solder; and (4) an Ag—Al—Cu alloy coating layer and/or an Al$_2$O$_3$ surface film in the rearwardly-disposed cavity to improve heat conduction from the heater therein.

Other objects and advantages of the present invention will become more apparent to those persons having ordinary skill in the art to which the present invention pertains from the foregoing description taken in conjunction with the accompanying drawings.

BRIEF DESCRIPTION OF THE DRAWINGS

FIG. 8(a) is a perspective view of a forward end of a soldering iron tip of the present invention showing a preliminary manufacturing step;

FIG. 8(b) is a view similar to FIG. 8(a) showing a subsequent manufacturing step thereof;

FIGS. 9(a), (b) and (c) are sectional views illustrating a liquid phase sintering mechanism of the present invention;

FIG. 18 is an elevational view of a soldering iron tip core of the present invention showing a cleaning step;

FIG. 19 is a view showing the core of FIG. 16, a MIM cap of the present invention and silver particle paste being applied to a tip of the core and the inside of the cap;

FIG. 20 is a view similar to FIG. 19 showing the core, the cap and a brazing filler ring in exploded relation;

FIG. 21 is a view similar to FIG. 20 showing the cap pressure fitted in place;

FIG. 22 is a view similar to FIG. 21 showing flux on the core, ring and cap before brazing;

FIG. 39 is an enlarged view taken on circle 39 of FIG. 1 showing a first coating embodiment;

FIG. 40 is an enlarged view taken on circle 40 of FIG. 1 showing a second coating embodiment; and FIG. 41 is an enlarged view taken on circle 41 of FIG. 1.

DETAILED DESCRIPTION OF PREFERRED EMBODIMENTS OF THE INVENTION

General Description of a Soldering Iron Tip

Figure 1:
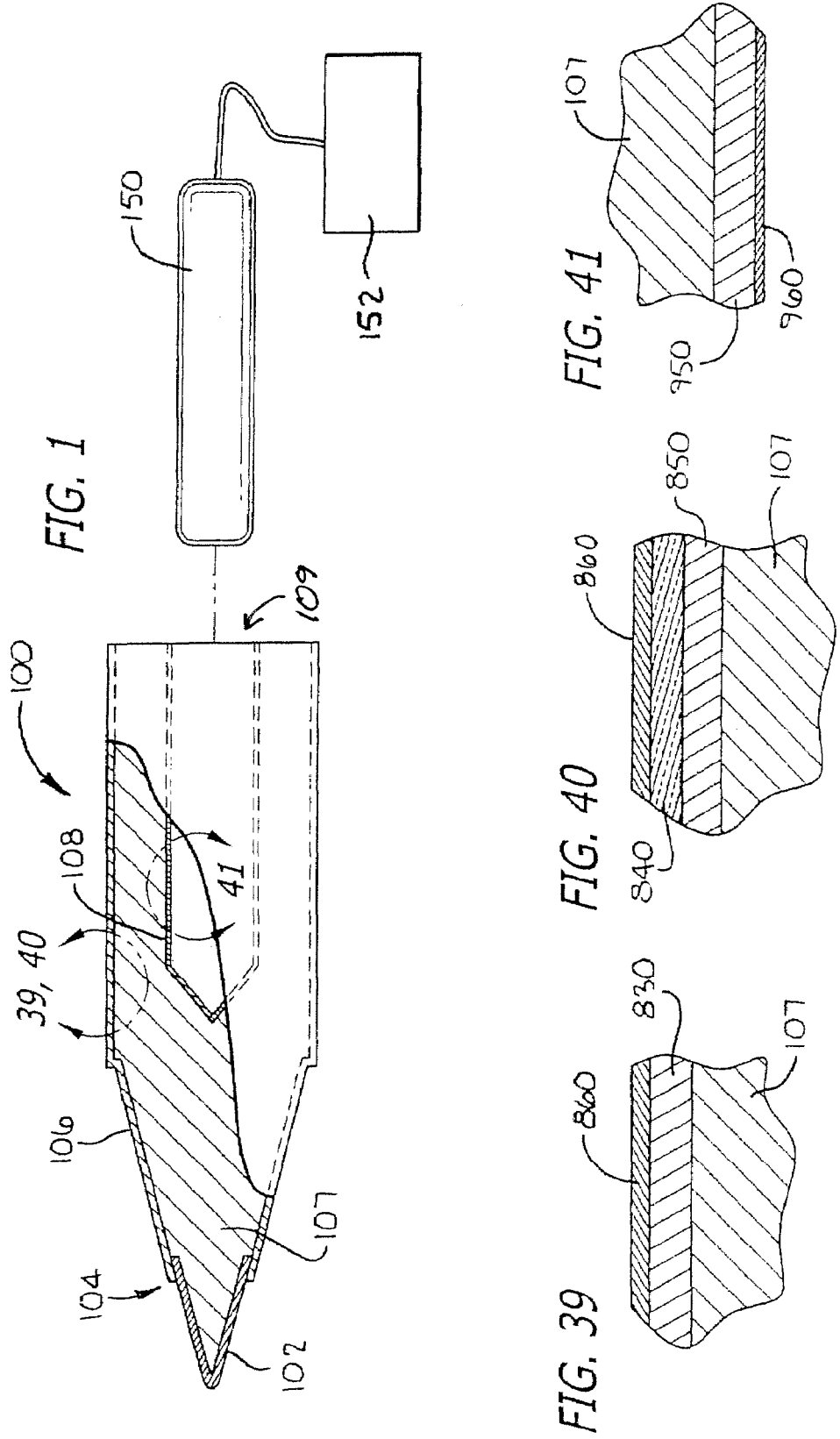
FIG. 1 is a partial cross-sectional view of a soldering iron tip of the present invention.

Referring to FIG. 1, a cross-sectional view of a preferred soldering iron tip of the present invention is illustrated generally at 100. Illustrated therein are four features, namely, the MIM cap 102, the joint 104 for the cap, the thermal spray coating 106 on the core 107, and the thermal barrier coating 108 in the cavity 109. Each of these will be described in greater detail and with other applications and alternatives in subsequent sections in this disclosure.

Advantages of the soldering iron tip 100 of FIG. 1 are that it is free of lead and chromium, can be used with lead-free solder, allows for the selection of various alternative materials (for longer life Fe-0.8C, for more wetness: Fe—Ag, Fe—Cu), better thermal conduction because the insert pipe has been removed, less error than caused by plating thickness, can be produced rather quickly so as to reduce stock (from forty-five days down to one day), and can be adapted and applied not only to electrical soldering tools but also to desoldering tools. Each of the features will now be discussed in detail.

The Metal-Injection-Molded (MIM) Cap

Figure 2:
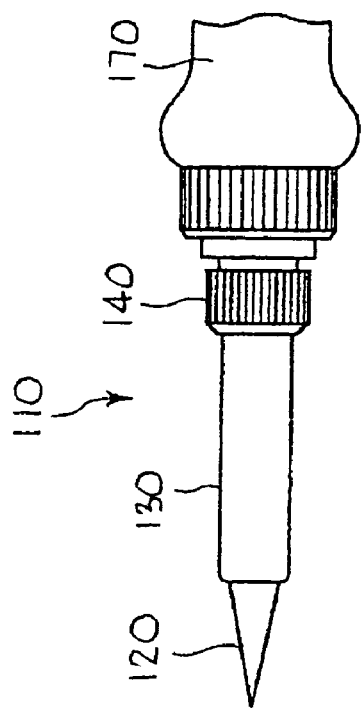
FIG. 2 is a side view of a front portion of an electric soldering iron according to a first embodiment of the present invention.
Figure 3:
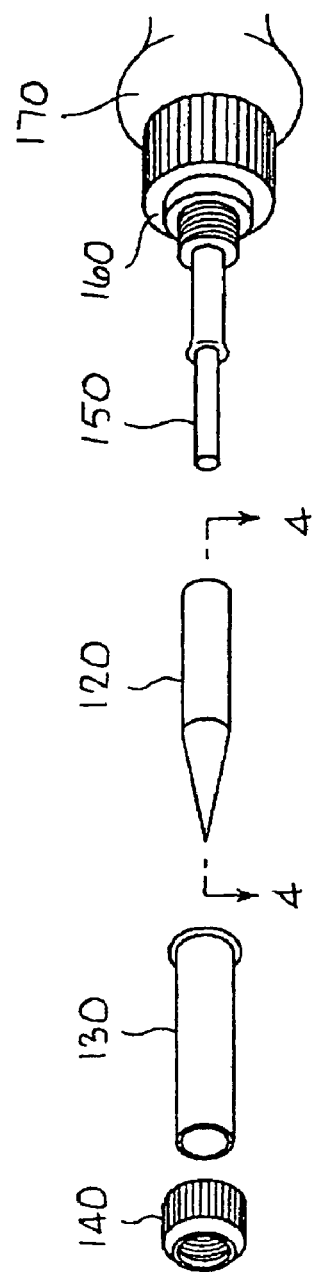
FIG. 3 is an exploded perspective view of FIG. 2.

A first embodiment of the present invention is described with reference to FIGS. 2-12. FIG. 2 is a front view of the forward end of an electric soldering iron 110 and FIG. 3 is an exploded perspective view thereof. At the forward end of the electric soldering iron 110 is a soldering iron tip 120 (corresponding to the soldering iron tip for handling solder) which protrudes from a protective pipe 130 as a conical forward end housed in the protective pipe 130. The protective pipe 130 is fixed on a nipple 160 of the electric soldering iron 110 by a cap nut 140. A cavity 210 (see FIG. 4) is provided at the interior of a cylindrical trunk segment of the soldering iron tip 120, which is covered by the protective pipe 130. This is assembled with the ceramic heater 150 (powered by a power supply shown schematically at 152 in FIG. 1), which protrudes from a main body 170 of the electric soldering iron 100, fitted into this cavity 210. The ceramic heater 150 generates heat when a power switch is turned on, and is maintained within an adjustable predetermined temperature range by a thermostat mechanism.

Figure 4:
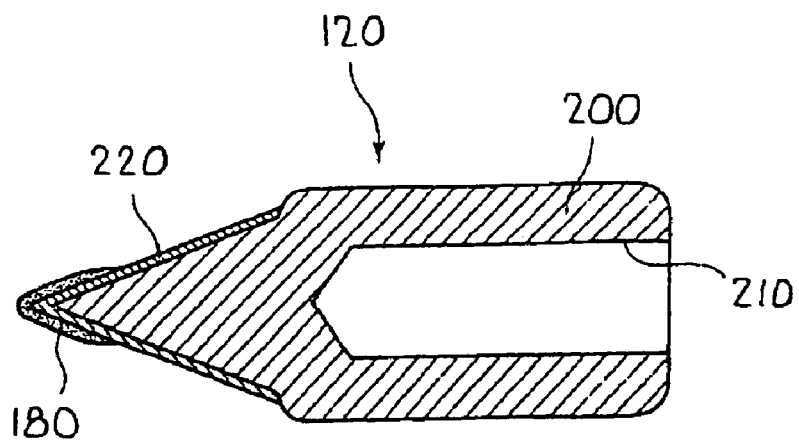
FIG. 4 is an enlarged cross-sectional view taken on line 4-4 of FIG. 3.
Figure 5:
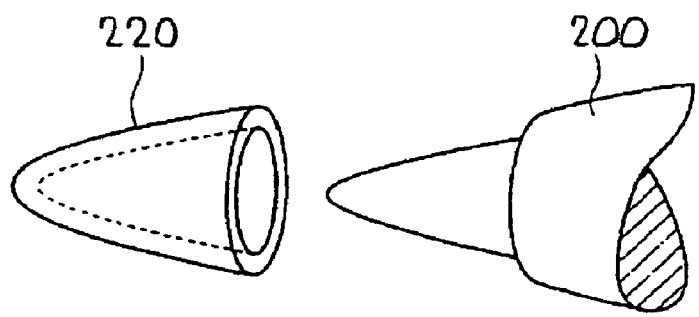
FIG. 5 is an exploded perspective view of FIG. 4.

FIG. 4 is an enlarged sectional view of the soldering iron tip 120, taken on line 4-4 in FIG. 3; and FIG. 5 is an exploded perspective view of the forward end of the soldering iron tip 120. The soldering iron tip 120 comprises a soldering iron tip core 200 (which includes a cylindrical trunk and a conical forward end), and a soldering iron forward end member 220, which is brazed to this forward end according to a preferred embodiment. The soldering iron tip core 200 is formed of relatively inexpensive copper or copper alloy having good thermal conductivity and electrical conductivity. An example of the copper alloy is a copper-tellurium alloy. A thin chromium plating can be applied on the exposed portion of the exterior of the soldering iron tip core 200. The soldering iron forward end member 220 is the part that directly contacts and melts the solder. In normal usage, the forward end of the soldering iron forward end member 220 is coated with a solder layer 180. This soldering iron forward end member 220 is principally comprised of iron but also selectively comprises nickel, cobalt, copper, silver, tin, boron, carbon, and the like, at predetermined content ratios; it is a metal particle sintered body manufactured by means of powder metallurgy.

The compositions and methods of manufacturing are described below. Furthermore, depending on the manufacturing method, various configurations are possible for the shape of the soldering iron forward end member 220. These variations are also included in the description below.

According to the construction described above, the electric soldering iron 110 is such that the ceramic heater 150 generates heat when the power switch is turned on. This heat is rapidly and efficiently transmitted to the surface of the soldering iron forward end member 220 from the cavity 210 of the soldering iron tip 120. When the temperature of the solder in the solder layer 180 on the soldering iron forward end member 220 exceeds the melting point thereof, the solder melts, and the solder is applied together with newly supplied solder.

As the forward end of the soldering iron forward end member 220 is coated by the solder layer 180, when the solder is applied, the molten solder layer 180 becomes the heating medium, so that heat is supplied to the part being soldered, and solder can be applied well. Since the solder layer 180 is formed on the soldering iron forward end member 220, this can easily be wet with solder. Good solder wettability is important for good soldering. This is because, if the soldering iron forward end member 220 does not have good solder wettability, the route by which heat is supplied to the part to be soldered is limited to the contact with the soldering iron forward end member 220, resulting in poor heat transmission and soldering.

Furthermore, if soldering operations are performed many times, the surface of the soldering iron forward end member 220 is corroded or eaten away by the solder. It is preferable that the amount of this corrosion be small, but as this increases at higher temperatures, the situation is worse with lead-free solders that have higher melting points than Sn—Pb solders. Furthermore, the corrosion is greater, even at the same temperature, due to the high tin content in lead-free solders, as compared to Sn—Pb solders. As the soldering iron forward end member 220 is considerably thicker than conventional platings, the resistance to corrosion and the working life of the end member are increased.

Control of the temperature of the soldering iron tip during the soldering is important; the tip is used with the temperature adjusted to approximately 340° C. when Sn—Pb eutectic solder is used, and to approximately 380° C. when lead-free solder is used (for Sn-0.7% Cu solder). If the temperature is too high, the surface of a soldering iron tip after numerous soldering operations turns black, solder wetting suffers, and the tip needs to be replaced. In such cases, or if one wishes to change the shape or the material of the soldering iron tip depending on the usage, this can be disassembled, as shown in FIG. 3, by loosening the cap nut 140, and the soldering iron tip 120 can easily be replaced.

Next, the components of the soldering iron tip 120 are described. The Table below is a component table showing the content by weight (%) of the particles used in the manufacture of the metal particle sintered body that forms the soldering iron forward end member 220. The vertical axis of the Table shows "types" assigned to different combinations of particles. Here, eleven types have been given by way of example, but other preferred combinations may be used, within the scope of the invention. The horizontal axis shows the types of powders actually used in the composition of the metal powder sintered body. Particle types can be broadly classified into sintering base materials and sintering additives. At least one of iron (Fe), nickel (Ni), and cobalt (Co) is chosen as the particles for the sintering base material. Types 9 through 11 use only a sintering base material. In Types 1 through 8, in addition to the sintering base material, sintering additive particles, chosen from at least one of copper (Cu), silver (Ag), tin (Sn), boron (B), and carbon (C) are used. In the top half of each row, the percent by weight of the various particles used, with respect to the total particles, is shown, and in the bottom half, the preferred ranges (omitted for Types 9 through 11) are shown in brackets.

TABLE

| | Basic Sintering Material | | | | Sintering Additive | | | | | |
| --- | --- | --- | --- | --- | --- | --- | --- | --- | --- | --- |
| Type | Iron (Fe) | nickel (Ni) | cobalt (Co) | total basic material | copper (Cu) | silver (Ag) | tin (Sn) | boron (B) | carbon (C) | total additive-weight % |
| 1 | 93.2 | — | — | 93.2 | 5.5 | 1.3 | — | — | — | 6.8 |
|   | (88-98.5) |   |   | (88-98.5) | (1.0-10.0) | (0.5-2.0) |   |   |   | (1.5-12.0) |
| 2 | 74.0 | — | — | 74.0 | 24.0 | 11.0 | — | — | — | 35.0 |
|   | (60-88) |   |   | (60-88) | (10-38) | (2.0-2.0) |   |   |   | (12.0-40) |
| 3 | 90.7 | — | — | 90.7 | 5.5 | 1.3 | 2.5 | — | — | 9.3 |
|   | (83-98.5) |   |   | (83-98.5) | (1.0-10.0) | (0.5-2.0) | (0-5.0) |   |   | (1.5-17) |
| 4 | 94.5 | 5.0 | — | 99.5 | — | — | — | 0.5 | — | 0.5 |
|   | (89-99.99) | (0-10) |   | (99-99.99) |   |   |   | (0.01-1.0) |   | (0.01-1.0) |
| 5 | 68.2 | 25.0 | — | 93.2 | 5.5 | 1.3 | — | — | — | 6.8 |
|   | (38.0-98.5) | (0-50) |   | (88-98.5) | (1.0-10.0) | (0.5-2.0) |   |   |   | (1.5-12.0) |
| 6 | 83.2 | — | 10.0 | 93.2 | 5.5 | 1.3 | — | — | — | 6.8 |
|   | (68-98.5) |   | (0-20) | (88-98.5) | (1.0-10.0) | (0.5-2.0) |   |   |   | (1.5-12.0) |
| 7 | 58.2 | 25.0 | 10.0 | 93.2 | 5.5 | 1.3 | — | — | — | 6.8 |
|   | (18-98.5) | (0-50) | (0-20) | (88-98.5) | (1.0-10.0) | (0.5-2.0) |   |   |   | (1.5-12.0) |
| 8 | 99.2 | — | — | 99.2 | — | — | — | — | 0.8 | 0.8 |
|   | (98-99.7) |   |   | (98-99.7) |   |   |   |   | (0.3-2.0) | (0.3-2.0) |
| 9 | 100 | — | — | 100 | — | — | — | — | — | — |
| 10 | 58 | 42 | — | 100 | — | — | — | — | — | — |
| 11 | 54 | 28 | 18 | 100 | — | — | — | — | — | — |

For example, the components in Type 1 are 93.2% Fe/5.5% Cu/1.3% Ag. The preferred ranges for each of the components are Fe: 88-98.5%, Cu: 1-10%, Ag: 0.5-2%. The entries for Types 2 -11 follow the same notation. The amounts of these particles used may be determined within the preferred range for each of the particles, but if a sintering additive is used, this is adjusted so that the total amount of the sintering base material is within the range of 60-99.99%, and the total amount of sintering additive is within the range of 0.01-40%. For example, the amounts of sintering additives in Type 2 may be determined within the ranges of Cu: 10-38% and Ag: 2-20%, but these are selected so that the totals thereof do not exceed 40%.

With regard to iron particles, which constitute a sintering base material, iron is an important (or indispensable) primary component for successful corrosion resistance. Consequently, iron particles are used in all of Types 1-11, and, in Type 9, only iron particles are used. However, as is also known from conventional iron-plating methods, impurities in iron negatively impact soldering performances and therefore, iron powder having a purity of no less than 99.5% is used for the iron particles. When the iron particles have a high purity, losses in thermal and electrical conduction can be avoided, soldering performance improved, and the density of the metal particle sintered body increased. If the iron particles contain large quantities of impurities, such as carbon (C), oxygen (O), nitrogen (N), or hydrogen (H), the corresponding density of the metal particle sintered body may be no greater than 90%, while in the present embodiment, which uses high-purity iron powder, the density is increased to no less than 96%.

Nickel particles and cobalt particles are also suitable choices as sintering base materials. Nickel and cobalt belong to the iron group, which is Group VIII of the periodic table. Accordingly, nickel particles and cobalt particles have similar characteristics to iron particles, and not only can these be used as a substitute material for iron, but characteristics superior to those of iron particles alone are demonstrated with certain combinations thereof. Nickel particles are used in Types 4, 5, and 10; cobalt particles are used in Type 6; and both are used in Types 7 and 11.

Fe—Ni sintered alloys, which use both iron particles and nickel particles as sintering base materials, produce sintered products with improved soldering performance, as compared with iron alone. In this case, the amount of nickel particles added is preferably no greater than 50%. If the amount of nickel particles exceeds 50%, the corrosion resistance is inferior and solder corrosion progresses rapidly.

Fe—Co sintered alloys, which use iron particles and cobalt particles as sintering base materials, promote sinterability and suppress solder corrosion. In this case, it is preferable that the amount of cobalt particles added be no greater than 20%. If 20% is exceeded, the soldering performance is inferior, and the cost is increased.

The use of 1-10% of copper particles as a sintering additive (Types 1, 3, 5, 6, and 7) not only improves solder wetting, but allows a high-density Fe—Cu sintered alloy to be produced due to liquid phase sintering, which is extremely efficient. Liquid phase sintering (in the case of copper) is a method wherein the sintering temperature is set to greater than the melting point of copper, which is 1083° C., so that the copper is liquefied during the sintering process. Preferably, 1-10% of copper particles are added; at less than 1%, the effect is small, and at greater than 10% when liquid phase sintering occurs, the formed product readily deforms as a result of local melting of the copper particles.

An Fe—Cu sintered alloy, in which greater than 10% of copper particles are added, may be used (Type 2). However, in this case, the temperature is set to less than the melting point of copper for the reasons given above. If prepared in this manner, while the corrosion resistance characteristics are slightly lowered, the thermal conductivity and the soldering performance are improved, making this suitable when soldering performance is more important than corrosion resistance. Furthermore, this Fe—Cu sintered alloy containing a large amount of copper particles is characterized by lesser decreases in thermal conductivity than solution alloys. For example, as compared to solution Fe-50% Cu alloys having an electrical conductivity of no greater than 20% IACS, these Fe—Cu sintered alloys show a high electrical conductivity of 50% IACS. This relationship is also proportional for thermal conductivity. It is preferable that no more than 40% of copper particles be added; generally if 40% is exceeded, solder corrosion increases.

If silver is used as a sintering additive (e.g., Types 1, 2, 3, 5, 6, and 7), a high-density Fe—Ag sintered alloy can be achieved as a result of liquid phase sintering at an even lower temperature than where copper particles alone are used. This is because the melting point of silver is lower than that of copper, at 960° C. Furthermore, in the Fe—Cu sintered alloy, having a large quantity of copper particles described above (Type 2), an Ag-28% Cu (eutectic temperature 780° C.) low melting point particle may be used. It is preferable that 0.5-20% of silver particles or silver-copper particles be added; if 20% is exceeded, production cost increases.

If tin particles are used as a sintering additive (Type 3), soldering performance is improved. Additionally, since tin has a low melting point of 232° C., liquid phase sintering can be achieved at an even lower temperature. In terms of adding tin particles in this manner, it is also effective to add copper particles and silver particles at the same time, as in Type 3. However, it is preferable to add no more than 5% of tin particles. If this amount is exceeded, the metal particle sintered body becomes weak as a result of compounds, such as $FeSn_2$, which are formed.

If boron particles are used as the sintering additive (Type 4), boron is interstitially diffused among the iron group elements, furthering mutual diffusion of the solids within each other, allowing sintering at the relatively low temperature of 1100° C. Adding a small amount of boron particles has the advantage of having substantially no negative effect on soldering performance, and it is preferable that 0.01-1% be added. At less than this, the effect is small, and if the upper end of the range is exceeded, the soldering performance tends to deteriorate. In addition to adding boron particles alone, particles of alloys containing boron, such as Fe—B particles, Ni—B particles, or Cu—B particles, may be added.

If approximately 0.8% of carbon particles are used as a sintering additive (Type 8), the corrosion resistance of the soldering iron tip 120 is greatly improved, and the life thereof can be greatly extended.

The metal particles used for the sintering base materials and the sintering additives described above suitably have a particle size of no greater than two hundred μm, preferably no greater than fifty μm, and still more preferably, they are ultrafine particles (that is, nano particles). By using such small metal particles, the density of the metal particle sintered body can be increased as well as the corrosion resistance and soldering performance.

Figure 6:
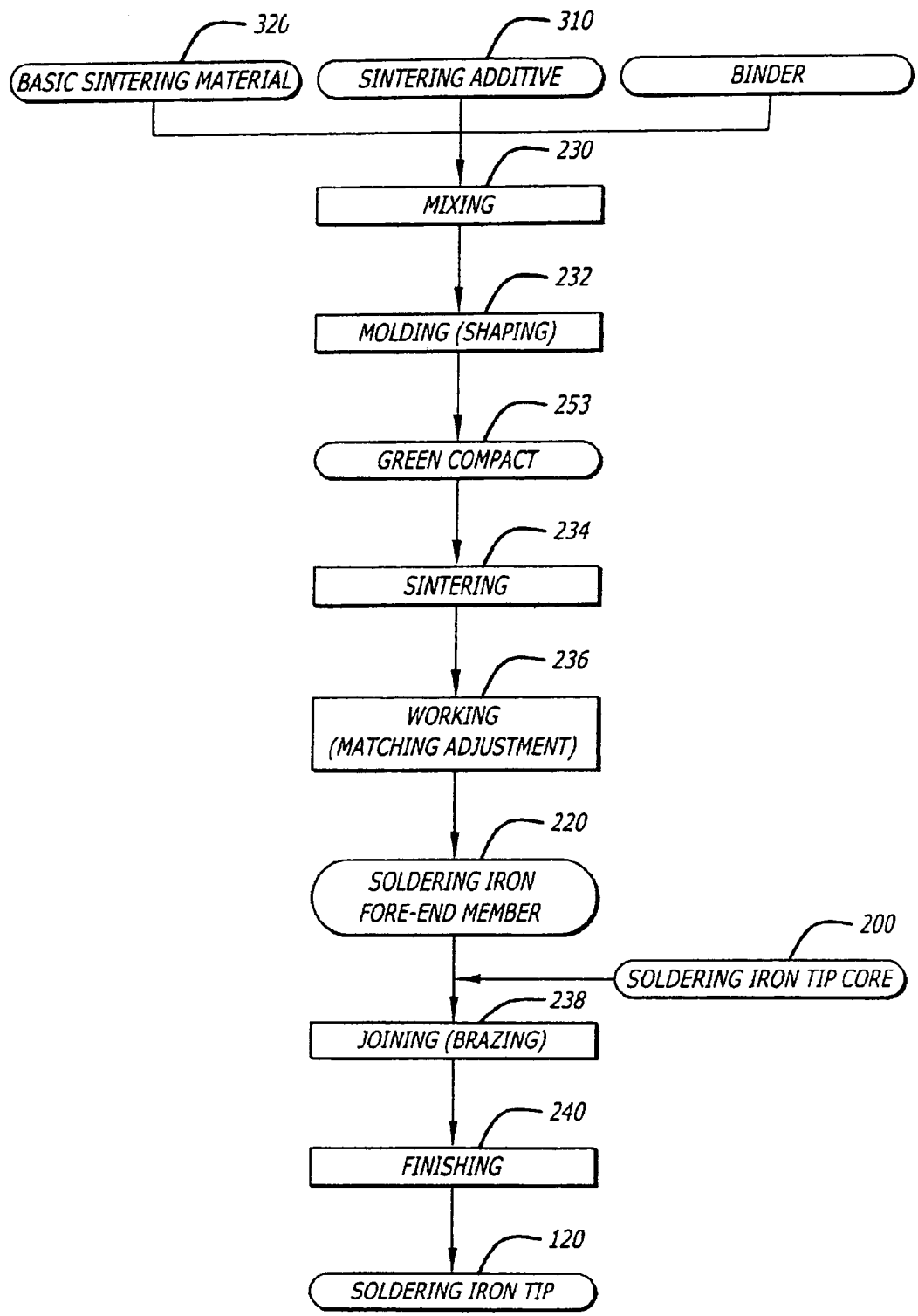
FIG. 6 is a flowchart showing a process for manufacturing a soldering iron tip of the present invention.

A method of manufacturing the soldering iron tip 120 is now described. FIG. 6 is a process diagram for the manufacture of the soldering iron tip 120. In step 230, the sintering base material, the sintering additive, and a binder (additive agent) are mixed in a mixer. Next, in step 232, this mixture is pressure molded in a press mold, an injection mold, or the like, to form a green compact (shaping). The shape of the green compact is roughly similar to the shape of the soldering iron forward end member 220. Thereafter, the green compact is removed from the mold; and in step 234, the green compact is sintered in a non-oxidative atmosphere at a predetermined temperature (800-1300° C.) to form a metal particle sintered body. Next, in step 236, this is machined to match to the soldering iron tip core 200 and to complete the soldering iron forward end member 220. Next, in step 238, the soldering iron forward end member 220 is joined to the forward end of the soldering iron core 200 by brazing. Brazing is performed at 650-850° C., using BAg-7 or BAg-8 silver brazing alloy. In addition to brazing, joining may be achieved by pressure welding, friction welding, or the like. Finally, in step 240, the dimensional accuracy is achieved by finishing, completing the soldering iron tip 120.

Sintering the soldering iron forward end member 220 using powder metallurgy provides flexibility in shaping, and allows a shape to be produced which is close to the final shape, so that final grinding procedures can be reduced or even eliminated. Furthermore, as compared to solution processes, it is not necessary to heat the green compact to the melting point of iron, which reduces energy consumption and lessens the environmental impact. Thus, since discharge processing, such as when conventional iron plating was used, is not necessary, environmental damage is reduced, allowing for energy savings and mass production.

Figure 7:
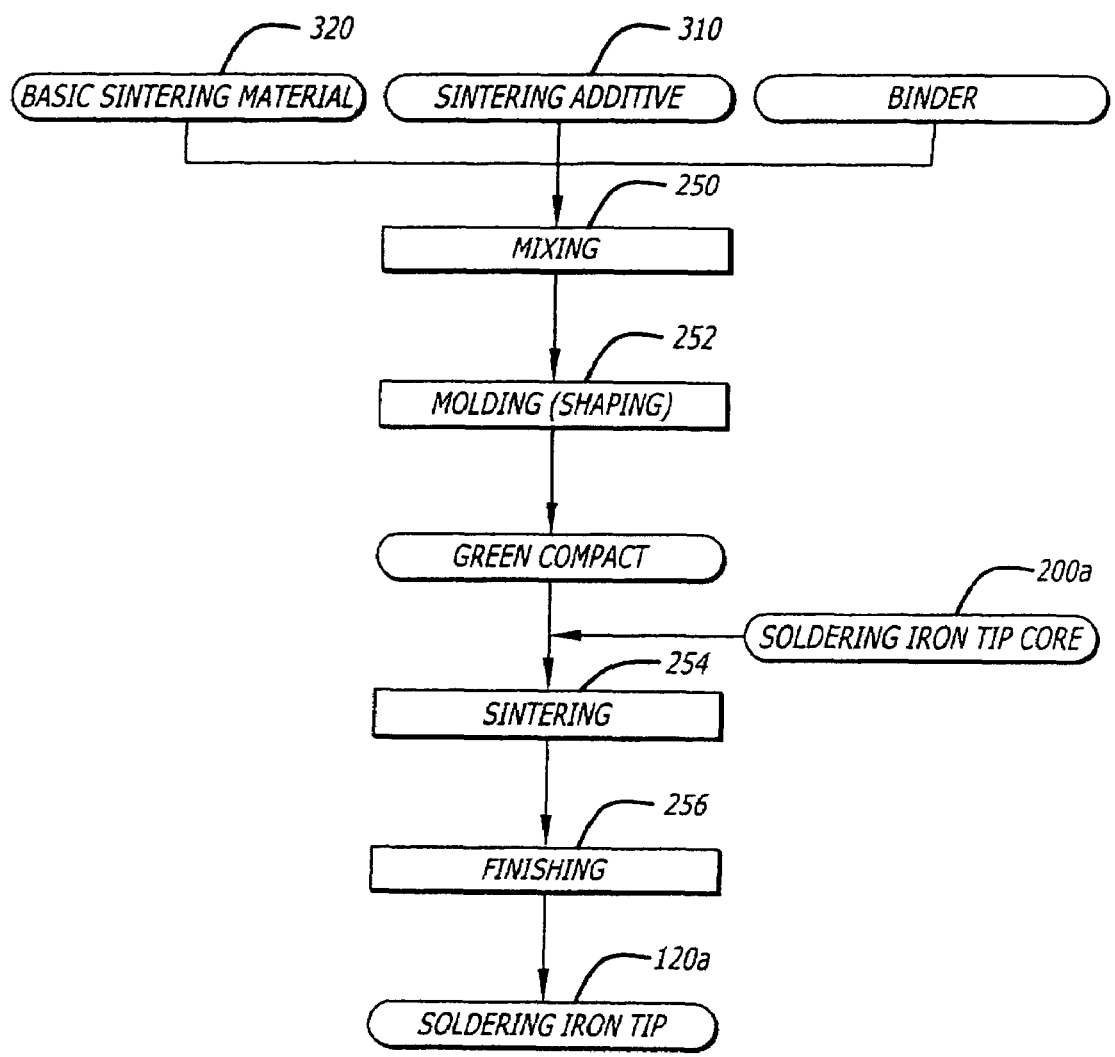
FIG. 7 is a flowchart showing an alternative process for manufacturing a soldering iron tip of the present invention.

Various manufacturing methods in powder metallurgy can be used. FIG. 7 is a production diagram for the manufacture of the soldering iron tip 120a shown in FIG. 8 by means of sintering it and at the same time joining it to the soldering iron tip core. In step 250, the sintering base material, the sintering additive, and a binder are mixed in a mixer. Next, in step 252, the mixture is pressure molded in a press mold or an injection mold, or the like, to form a green compact (shaping) 253. The shape is a cylinder having roughly the same shape as the metal particle sintered body 260 in FIG. 8(a). Thereafter, the green compact is removed from the mold and affixed to the forward end of the soldering iron tip core 200a. In step 254, this is fired and sintered in an oxidative atmosphere at a predetermined temperature (no less than 800° C. and no greater than the melting point of the soldering iron tip core, which is made from copper or a copper alloy), so as to form the metal particle sintered body 260, while at the same time joining it to the soldering iron tip core 200 (the situation shown in FIG. 8(a)). Thereafter, in step 256, the dimensional accuracy is adjusted by way of finishing, completing the soldering iron tip 120a (as shown in FIG. 8(b)). Thus, an additional step of joining the soldering iron forward end member 220a and the soldering iron tip core 200a by brazing or the like is not needed, improving production efficiencies.

The molding indicated in step 232 of FIG. 6 or step 252 of FIG. 7 can be pressureless molding, wherein pressure is not applied. On the other hand, pressure molding increases the density of the green compact, which allows for an increase in the density of the sintered metal particle sintered body. Then, if liquid phase sintering is used, it is possible to achieve a metal particle sintered body with an even higher density. Liquid phase sintering is a method wherein particles are used for the sintering additive, which has a relatively low melting point (copper particles, silver particles, Ag-28% Cu eutectic particles (eutectic temperature 780° C.), tin particles, and the like), and sintering is performed at temperatures higher than these melting points.

FIGS. 9(a), 9(b) and 9(c) are schematic sectional views illustrating the mechanism of liquid phase sintering. FIG. 9(a) shows the situation before pressure is applied in step 232 of FIG. 6 or step 252 of FIG. 7. As shown in the figure, sintering additive particles 320 are mixed into the sintering base material particles 310 before pressure is applied, and relatively large gaps 330 are formed. FIG. 9(b) illustrates the situation after the pressure molding of step 232 or step 252. As shown therein, after pressure molding, the sintering base material particles 310 and the sintering additive particles 320 are plastically deformed so as to be flattened, bringing the particles into close contact with each other but leaving small gaps 330. FIG. 9(c) illustrates the situation after liquid phase sintering in step 234 of FIG. 6 or step 254 of FIG. 7. As shown therein, as a result of recrystalization, the sintering base material particles 310 grow, and the gaps are filled by the sintering additive particles 320, which increases fineness. The reason for this is that, in addition to the solid state diffusion of the base material particles 310 themselves, the sintering additive particles 320 melt at the sintering temperature, wetting the sintering base material particles 310, while at the same time the gaps 330 are filled by this liquid as a result of surface tension. In addition to producing such high-density metal particle sintered bodies, liquid phase sintering allows for sintering at relatively lower temperatures, thereby saving energy.

Furthermore, after sintering the metal particle sintered body, the body can be further shaped by preform forging or powder forging at 300-500° C. to produce the soldering iron forward end member, as would be apparent to those skilled in the art from this disclosure. By using these methods, the fine gas cavities between the particles can be reduced and the particle density thereby increased.

Figure 10A:
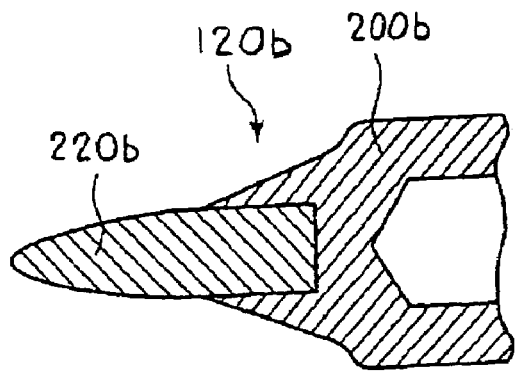
FIG. 10(a) is a cross-sectional view of an alternative soldering iron tip of the present invention.
Figure 10B:
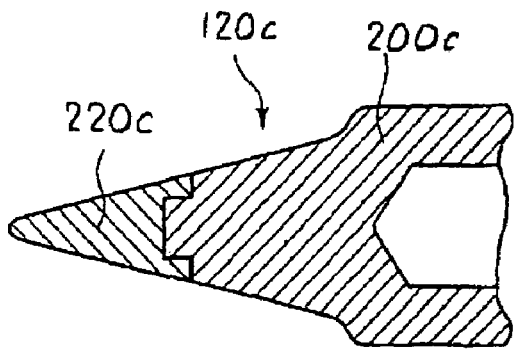
FIG. 10(b) is a view similar to FIG. 10(a) showing a variation thereof.

Other sintering methods which may be used include cold isostatic press compression molding (CIP), hot isostatic press compression molding (HIP), and mechanical alloying (MA). These methods are also generally known, and therefore, detailed descriptions thereof are not provided herein. However, when these methods are used, the metal particle sintered body is plastically formed into a rod or a filament, which is further machined to produce the soldering iron forward end member 220. FIGS. 10(a) and (b) are sectional views of the extremities of soldering iron tips produced in this manner. Soldering iron tips 120b and 120c are such that the ends of soldering iron tip cores 200b and 200c are joined by brazing to soldering iron forward end members 220b and 220c, which are produced by the previously-mentioned CIP, HIP, or MA methods.

Figure 11:
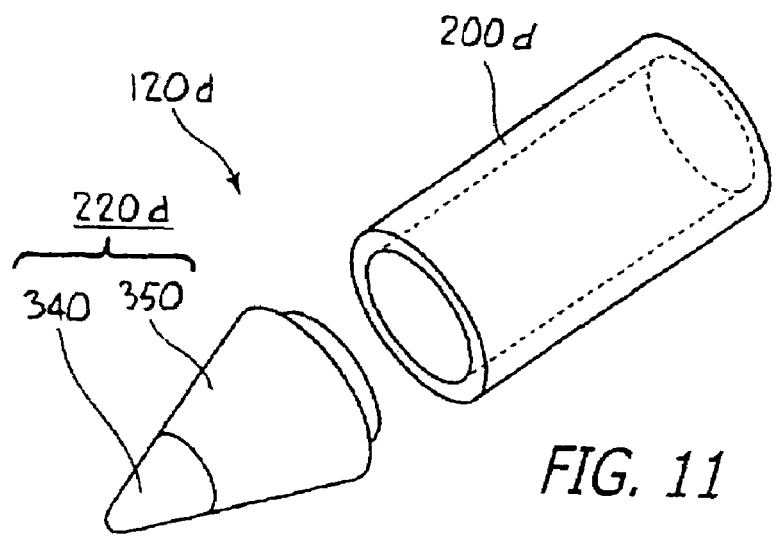
FIG. 11 is an exploded perspective view of an alternative soldering iron tip of the present invention.
Figure 12:
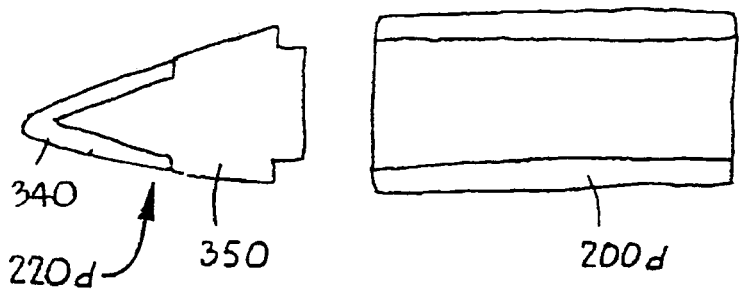
FIG. 12 is a cross-sectional view of the soldering iron tip of FIG. 11.
Figure 13:
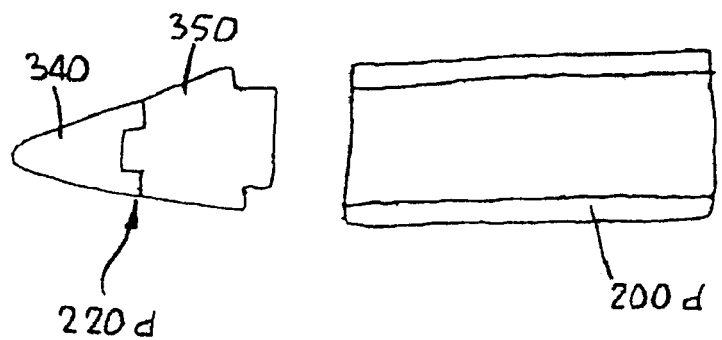
FIG. 13 is a view similar to FIG. 12 showing a variation thereof.
Figure 14:
FIG. 14 is a view similar to FIG. 12 showing an alternative forming method similar to FIG. 8(a)
Figure 15:
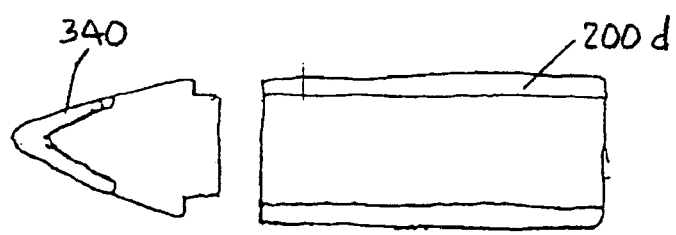
FIG. 15 is a view showing a subsequent forming step of the soldering iron tip of FIG. 14 (see, e.g., FIG. 8(b))

Another sintering method that can be used is a two-layer sintering method. FIG. 11 is an exploded perspective view of a soldering iron tip 120d, for which two-layer sintering was used. The soldering iron forward end member 220d comprises a first layer 340 and a second layer 350. The first layer 340 is produced from a mixture of the sintering base materials and the sintering additives described above, and the second layer 350 is sintered from copper particles or copper-chromium particles. The soldering iron forward end member 220d is thus a metal particle sintered body comprising two layers, which may be shaped directly. Furthermore, after making a sintered body, such as the metal particle sintered body 260 shown in FIG. 8(a), it can be machined to form a soldering iron forward end member 220d, as shown in FIG. 11. Next, a soldering iron tip 120d can be produced by brazing this machined member to a soldering iron tip core 200d. When a copper pipe is used as the soldering iron tip core 200d the need for machining of the inner face is eliminated, thereby saving power. FIGS. 12 and 13 are cross-sectional views of FIG. 11 to better show the layer construction. The tip can also be made pursuant to the method of FIGS. 8(a) and 8(b) as depicted in the cross-sectional views of FIGS. 14 and 15.

Figure 16:
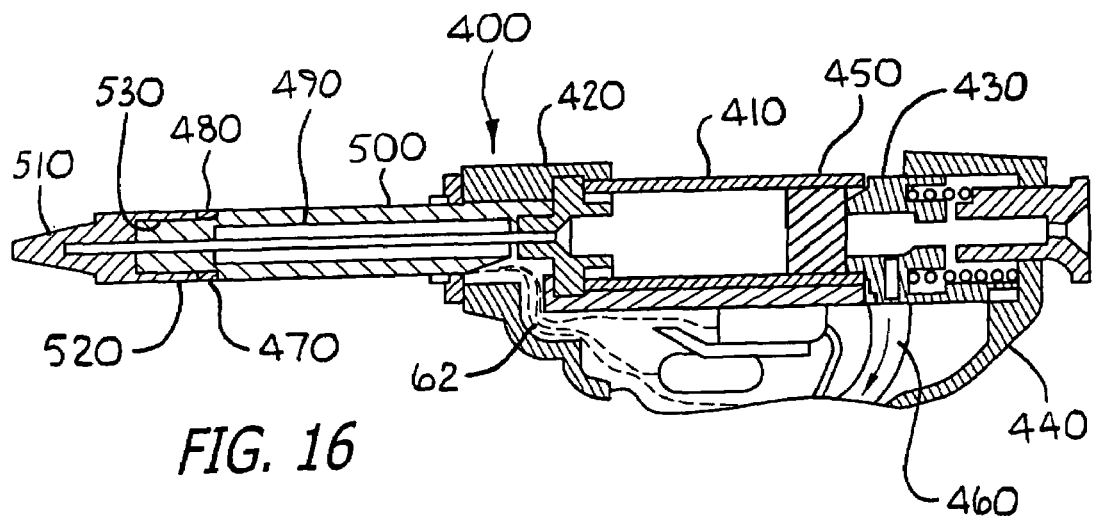
FIG. 16 is a cross-sectional view of a desoldering tool that includes a soldering iron tip of the present invention.

A second embodiment of the present invention is now described with reference to FIGS. 16 and 17. FIG. 16 is a partial sectional view of an electric solder suction device 400. In that figure, a tank 410 is shown removably fitted between a forward holder 420 and a rear holder 430 at the top of a main body case 440. The tank 410, which stores the suctioned molten solder, can be a cylinder made of a transparent material, such as heat-resistant glass, allowing observation of the interior. A filter 450, made from glass wool, is provided at the rear extremity of the tank 410, and the tank communicates with the rear holder 430 through this filter 450. A vacuum tube 460 is connected to the rear holder 430, and a vacuum is produced in the tank 410 by a vacuum pump.

The rear end of a stainless steel transport pipe 470, which communicates with the tank 410, is inserted into the forward holder 420. The forward end rod of the electric solder suction device 400 includes: a copper heating core 480, having an inner hole through which the transport pipe 470 passes; a ceramic heater 490, at the interior of the heating core 480; a protective pipe 500, which covers the outer circumferential face of the heating core; and a suction nozzle 510, which directly contacts with the solder to melt the solder and suction it (corresponding to a soldering iron tip for handling solder). A male thread 520 is formed at the end of the heating core 480, and a female thread 530, which cooperates therewith, is formed at the rear end of the suction nozzle 510, allowing the suction nozzle 510 to be removed and replaced as needed. At the forward end of the suction nozzle 510, a through-hole 540 (see FIG. 17) communicates with the transport pipe 470. The ceramic heater 490 is connected to a power cord by way of a lead 550.

When a vacuum suction switch, provided on the main body case 440, is turned on, the pressure inside the tank 410 and the transport pipe 470 is reduced by a vacuum pump. Furthermore, if the power supply to the ceramic heater 490 is turned on, the end of the suction nozzle 510 is heated. By contacting this heated end with solder, the solder is melted. The melted solder is then sucked into the transport pipe 470, by way of the suction nozzle 510, through the suction opening 560 (see FIG. 17). The suctioned molten solder is delivered to the tank 410 and stored therein. The tank 410 can be removed and replaced when filled.

Figure 17:
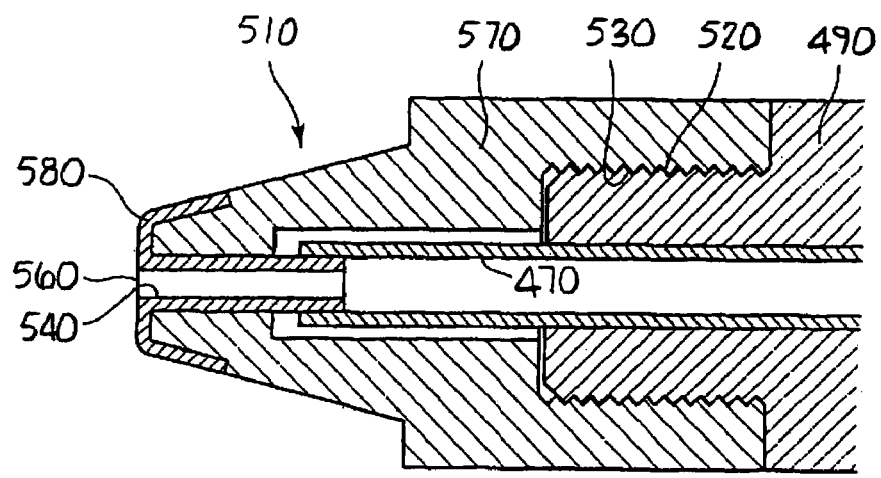
FIG. 17 is an enlarged view of the forward end of the desoldering tool of FIG. 16.
Figure 23:
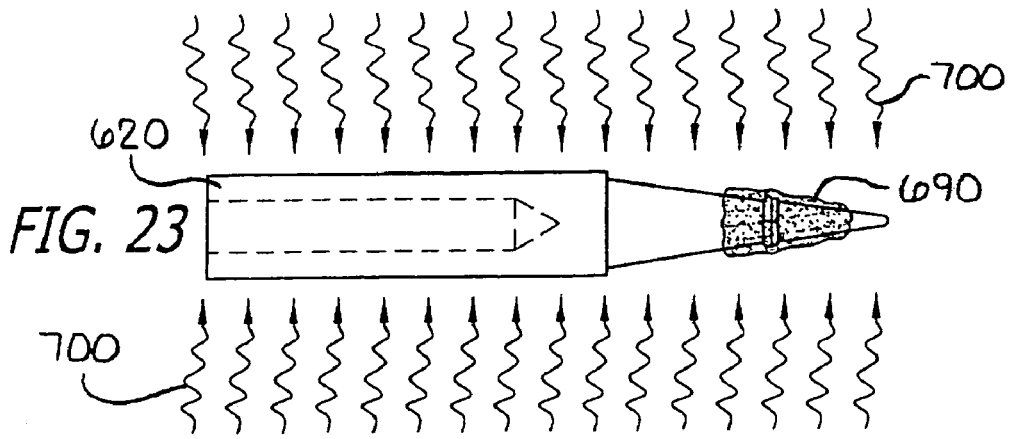
FIG. 23 is a view similar to FIG. 22 showing a brazing step.

FIG. 17 is an enlarged sectional view of the area of the suction nozzle 510 in FIG. 16. The suction nozzle 510 comprises a soldering iron tip core 570, made from copper or a copper alloy, and a soldering iron forward end member 580, made from a metal particle sintered body, as described in detail above. A through-hole 540 at the interior of the soldering iron forward end member 580 forms a suction opening 560, which opens at the exterior of the tip, for suctioning molten solder. The rear end is connected to the transport pipe 470. Conventionally, in addition to providing iron plating at the outer circumferential surface of the forward end of the suction nozzle of electric solder suction devices, an iron pipe was inserted into the interior in order to form a through-hole. However, according to the present embodiment of the invention, a soldering iron forward end member 580 alone is provided at the end of the suction nozzle 510, and iron plating is thereby not needed, which improves productivity and reduces discharge of environmental contaminants.

Furthermore, this suction nozzle 510 has good corrosion resistance against lead-free solder, which can extend the life thereof, as compared to conventional plated articles, while maintaining good solder wetting in the same manner as the soldering iron tip 120 (FIG. 2) of the first embodiment.

The sintering components for the soldering iron forward end member 580, the method of manufacturing the suction nozzle 510, and the like, are based on the soldering iron tip 120 of the first embodiment.

The soldering iron tip 120 illustrated in the first embodiment and the electric soldering iron 110 using that tip, the suction nozzle 510 illustrated in the second embodiment and the electric solder suction device 400 using that nozzle, as well as manufacturing methods therefor, have been described above, but the present invention is not limited thereby, and suitable variations may be devised within the scope of the patent claims.

Thus, the soldering iron tip for handling solder of the present invention is characterized in that according to a preferred embodiment, a soldering iron forward end member comprising a metal particle sintered body manufactured by powder metallurgy is provided at the forward end of a soldering iron tip core made of copper or a copper alloy. Thereby solder corrosion of the soldering iron tip for handling solder is prevented when lead-free solder is used, the solder application or solder removal characteristics are good, soldering iron forward end member properties optimized for the type of solder can easily be produced, and furthermore, discharge of environmental contaminants is reduced.

A Process for Joining the Cap to the Core

It is difficult to get a good connection or joint (see 104 in FIG. 1) when joining an iron-based sintered body (described hereinafter as "sintered cap") 600 (or 220) made by MIM molding technique with a copper-based soldering tip core member 620. Voids can result and the brazing filler material may not sufficiently flow into the joint part. This can result in poor thermal conduction from the core to the sintered tip, whereby slow thermal recovery and poor solderability result. Therefore a new brazing technique having high adhesion and consistent quality for non-iron plating soldering tips has been developed and will now be described. According to this invention, very small silver (Ag) particles or powders are used to provide an excellent joint.

The steps of a brazing method of the present invention will now be briefly described. The copper core of the soldering tip is mechanically processed, and grease thereon removed by washing with acid. The silver particles are applied to the inner surface of the sintered cap and the core member. A brazing filler metal ring is mounted and the cap is inserted and pressed onto the core member. Flux is then applied, brazing temperature applied and the flux sediment is subsequently removed.

The process is now described in greater detail with reference to FIGS. 18-26. Again, the copper base core member 620 of the soldering tip is mechanically processed and its surface is cleaned by washing it with acid as depicted by arrows 630 in FIG. 18 to remove any grease, such as fingerprints and other oily surfaces. A paste 640 of silver particles is applied to the core member 620 and to the inner surface 650 of the sintered cap 600, as shown in FIG. 19. Extremely small silver particles having a size of smaller than 10 μm are used. The particles are made into paste 640 using alcohol and applied to the tip of the core member and the inner surface of the sintered cap using absorbent cotton or a brush 660; 0.9 to 1.2 mg are applied to the tip 670 of the core 620; 1.0 mg is applied to the inner surface 650 of the sintered cap. About five hundred milligrams, an extremely small amount of silver particles are used. The silver particles fill the space, preventing oxidation and maintaining good thermal conduction. These particles increase adhesion even if no brazing filler material is used because the solid phase connection will be made even under a low temperature of 700° C. by diffusion reaction.

A brazing filler metal ring 680 (FIG. 20) is mounted to the core member 620. The silver braze (BAg-7) is processed in a 0.5 mm diameter ring and mounted to the brazing part of the core member. The composition of the silver braze (JIS-Z-3261) is preferably Ag-22% Cu-17% Zn-5% Sn. The melting temperature of the silver braze is 620 to 650° C. The operating temperature is 650 to 7600. The amount of silver braze used is 0.017 to 0.02 g. This silver braze is preferably used because its melting temperature is the lowest among all the silver brazes and will hold the softness of the core material. It further has good brazability characteristics and does not include any metal elements that will cause environmental pollution.

Referring to FIG. 21, the sintered cap 600 is then inserted on the tip of the core member 620. The sintered cap 600 can be made by MIM techniques as described elsewhere in this disclosure. The weight of the sintered cap 600 is about 0.1 g., and the weight of the core member 620 is about five grams, providing a weight ratio of about 1:50. The sintered cap 600 is inserted after mounting the silver brazing ring 680, as can be understood from FIGS. 20 and 21. After inserting the sintered cap 600 in place on the tip, pressure is applied to remove the extra space between the sintered cap to the core member.

Flux 690, such as AWS 3A type flux, is then applied, as depicted in FIG. 22. The flux 690 is selected to accommodate the silver braze (BAg-7) ring 680. The (paste) flux 690 is applied using a fine brush or by dipping the tip portion directly into the flux. Although applying the flux 690 only to the connection area is sufficient, it is preferable to apply it all over to prevent oxidation and aging.

Figure 27:
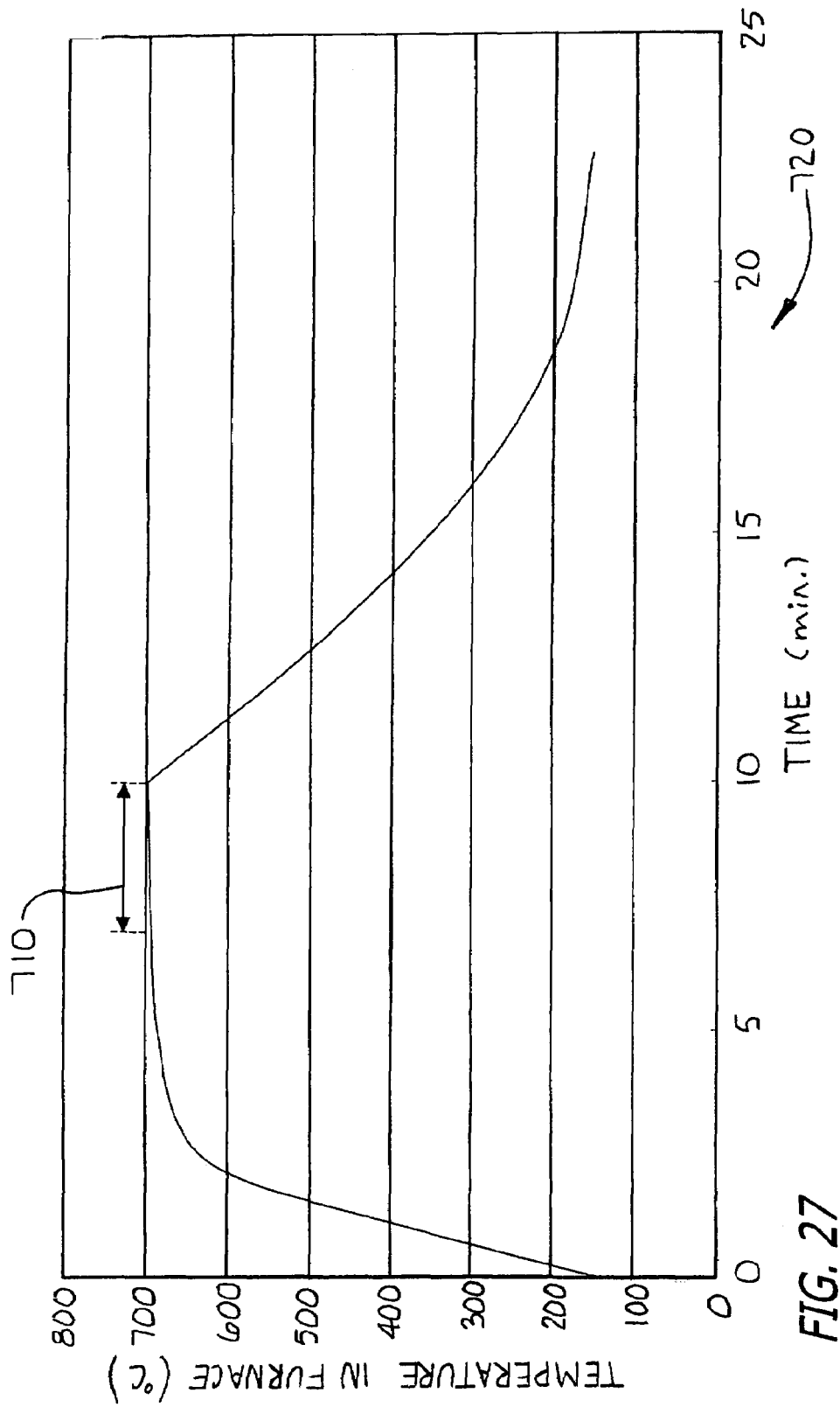
FIG. 27 is a heating-cooling graph for brazing the soldering iron tip of FIG. 23.

For the brazing methods steps described above, a tubular electric furnace is preferably used. The atmosphere inside the furnace can be nitrogen gas and the brazing temperature is 700° C. The brazing step is shown by arrows 700 in FIG. 23. The temperature is kept at that level for three minutes as depicted by reference numeral 710 in the heating-cooling graph shown generally by reference numeral 720 in FIG. 27; and the full brazing time is twenty-five minutes. The furnace is filled with gas such as nitrogen or argon, and brazed by using flux under the gas pressure.

Figure 24:
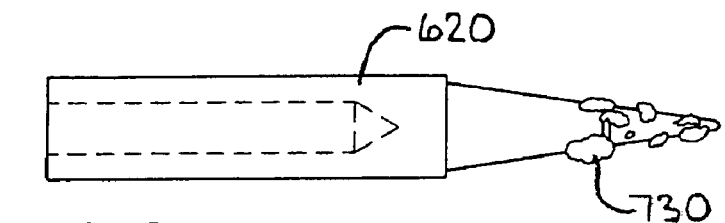
FIG. 24 is a view similar to FIG. 23 after the brazing step.
Figure 25:
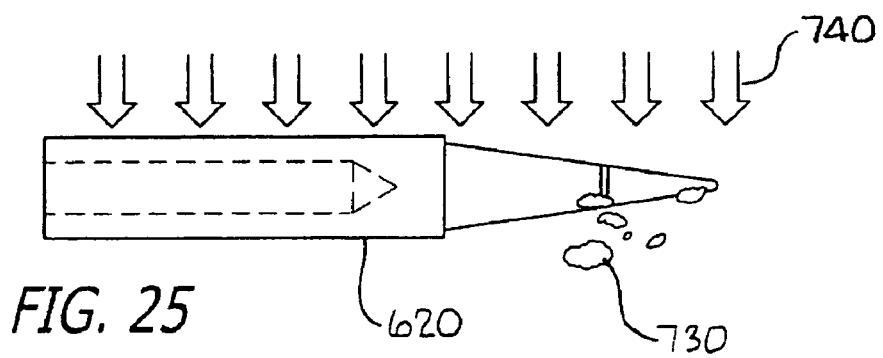
FIG. 25 is a view similar to FIG. 24 showing a flux sediment removal step.
Figure 26:
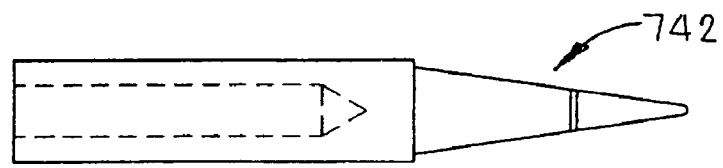
FIG. 26 is a view similar to FIG. 25 after the flux sediment has been removed.

The flux sediment 730 as shown in FIG. 24 on the surface of the soldering iron tip is removed after brazing, using warm water or by supersonic wave washing as illustrated by arrows 740 in FIG. 25. The flux sediment 730 has strong corrosion characteristics, so the part should be cleaned and dried and stored out of exposure to the atmosphere. The next step is to finish the brazing (as shown in FIG. 26) by machining or filing. A good silver-coated sintered soldering tip 740 is thereby produced because the sintered cap was brazed by applying flux onto its entire surface.

As described above, one of the methods for attaching or joining the metal particle sintered member or cap 600 to the forward end of the copper or copper alloy core 620 is to braze the sintered cap to the core. Discussed below in further detail are the construction of the joint part, how the brazing filler metal is applied and how a consistently good brazing joint can be obtained.

Figure 28:
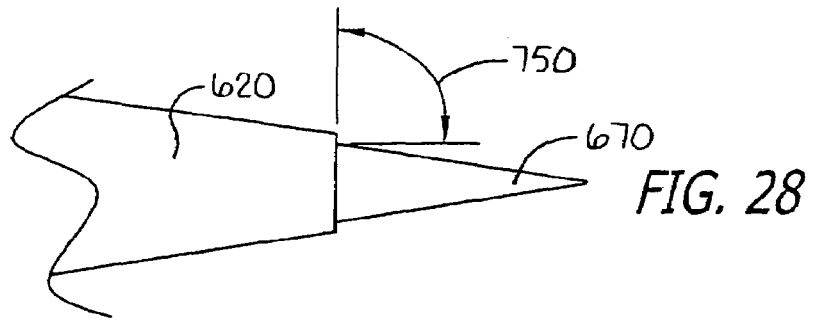
FIG. 28 is an enlarged view of the forward portion of FIG. 18 and showing a ninety-degree abutment shoulder.
Figure 31:
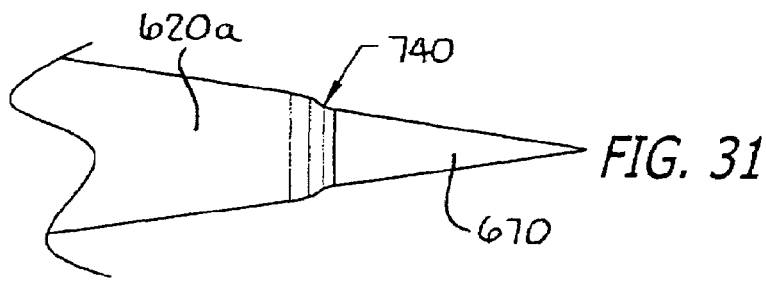
FIG. 31 is a view similar to FIG. 28 but showing a radiused abutment shoulder embodiment.

To join the sintered cap, two differently configured copper core members can be used. FIGS. 28 and 31 show the outside surfaces thereof. The core member 620a of FIG. 31 has a radius 740 (of approximately 150 degrees), and the core member 620 of FIG. 28 has a 90° tapered portion or abutment shoulder 750.

Figure 29:
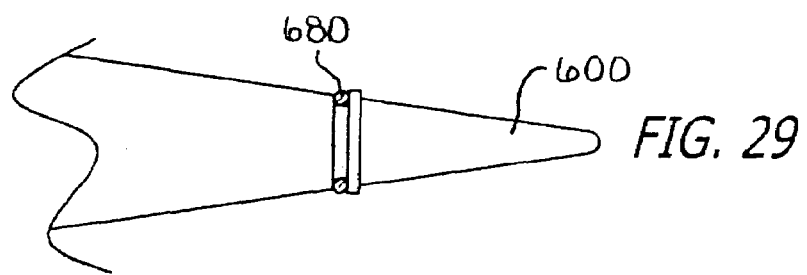
FIG. 29 is a view of the forward portion of FIG. 21.
Figure 32:
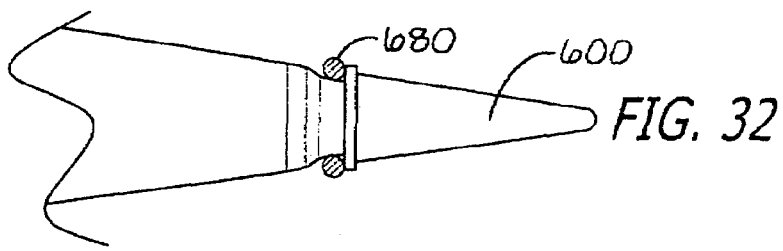
FIG. 32 is a view similar to FIG. 29 but with the embodiment of FIG. 31.
Figure 33:
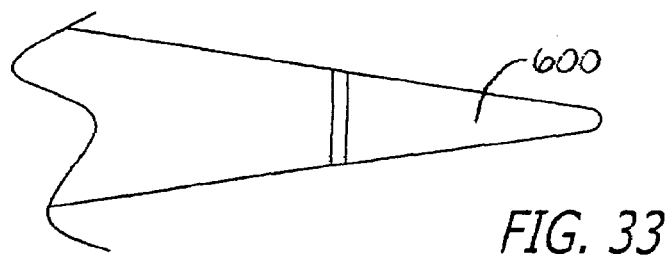
FIG. 33 is a view similar to FIG. 30 but with the embodiment of FIG. 31.

FIGS. 29 and 32 show the copper core member, the brazing filler ring 680 (BAg-7, 0.5 mm. diameter) fitted thereon, and the cap pressure-secured in place. (FIG. 22 shows the flux 690 applied to the part where the brazing filler ring 680 was secured and was brazed.) The two differently-configured core members have their own advantages and disadvantages.

Referring to FIG. 32, when applying pressure to the sintered cap, the brazing filler ring 680 moves upwardly opposite to the tip so processing accuracy is not required. However, it requires more brazing filler material and if enough is not provided, a groove will result.

Referring to FIG. 29, a space the size of the brazing filler ring's diameter (0.5 mm.), can be obtained. When applying pressure to the cap 600, the size of the space does not change; thus, high processing accuracy is required. Additionally, this configuration lacks in the amount of brazing filler material, but can get the same stable brazing.

Figure 30:
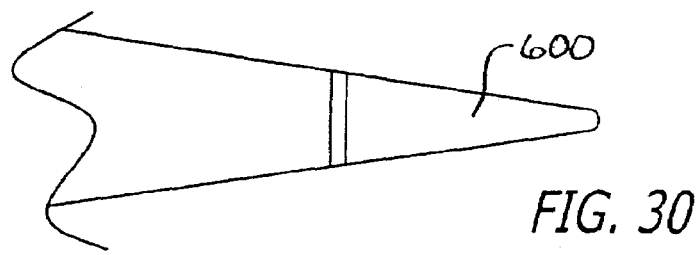
FIG. 30 is a view of the forward portion of FIG. 26.

Stable brazing can be obtained from the embodiment that uses the 90° abutment portion 750 (FIG. 28) as well as the one that provides the radius 740 (FIG. 31). However, using a 0.5 mm diameter brazing filler metal ring 680 requires an additional 0.5 mm space and that can cause insufficient brazing filler material. Thus, by calculating the volume of the space filling amount, the spacer size needs to be 0.3 mm or less to fill the space by the amount of the 0.5 mm ring brazing filler metal. Accordingly, the 0.5 mm brazing filler ring 680 is pressed to 0.3 mm as shown in the FIG. 29. This figure is after inserting the 0.3 mm ring with the sintered cap 600 to the copper tip core member and pressure applied to it. FIG. 30 shows the soldering iron tip after the brazing. There are no bumps on the cap space core member, whereby the cap and core act as a unitary construction.

Thus, pursuant to the brazing method described above, extremely small silver particles are applied to the tip of the core member and the inner surface of the sintered cap. After the silver particles have been applied, pressure is exerted to the sintered cap against the core member. Heating and brazing are conducted under non-oxidation atmospheres such as nitrogen, argon gas and using flux.

A Process for Spray Coating the Soldering Iron Tip

Figure 34:
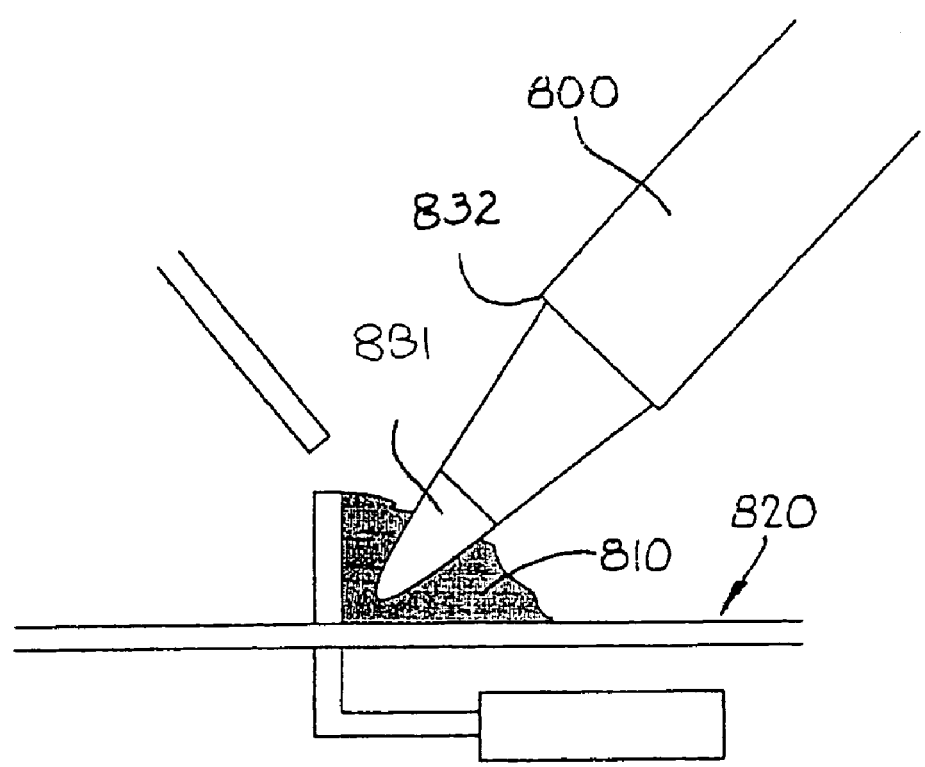
FIG. 34 is an elevational view of a forward portion of a soldering iron tip of the present invention shown in use.

The soldering iron tip 800, such as made using the MIM cap technique as described above or a plating layer of tin or tin alloy, transmits the heat from the heating element 150 in the cavity 109 (FIG. 1) through the pointed working end of the soldering iron tip as shown in FIG. 34 to the solder 810 on the work piece 820. The tip end 831 having a length of generally less than seven millimeters is plated with solder 810 to efficiently transmit the heat to the working tip portion. If the tip end is wettable by solder, the solder transmits the heat and the soldering is done effectively. On the other hand, if the soldering tip is wettable by solder all over the tip, such as up to point 832 in FIG. 34, the solder goes up the tip instead of staying at the working portion. Soldering then is ineffective and not as accurate.

In the past, to prevent the solder from extending up the tip (for example to point 832), the tip was processed with chromium plating at the rearward of the working tip end. Unfortunately, after a number of soldering operations, the chromium plating is gradually corroded or eroded as the tin in the solder eats the chromium plating (as well as the iron plating). Further, most of the active agents in flux contain chlorine which can also corrode the chromium plating. Thus, the chromium plating portion of the soldering tip according to the prior art can be eaten away, not only by the chlorine flux, but also by the tin solder. Additionally, it is difficult for the chromium plating to be applied without a gap between the soldering tip and the plated material. Further, chromium VI that is used for chromium plating is known to cause cancer and damage the health of humans and other living things.

Accordingly, the present invention provides for an alternative to the chromium plating of the prior art. Specifically, a flame or a plasma spray coating 106 (FIG. 1) is used to spray various materials such as ceramics, cermet, and metals having high melting points. Metals 830 (FIG. 39) which perform well and have good adhesion to the copper core 107 include SUS316 stainless steel and molybdenum (Mo). Examples of ceramics 840 (FIG. 40) showing good performance are: $Al_2O_3$ 02.5% $TiO_2$, 62% CaO-33% $SiO_2$, $ZrO_2$-8% $Y_2O_3$, 70% $Al_2O_3$-29% MgO, $Al_2O_3$-40% $TiO_2$, $ZrO_2$-20% MgO, $Cr_2O_3$, $ZrO_2$-4% CaO, and $ZrO_2$—$CeO_3$.

When using ceramic coating or plating 840, the adhesion and corrosion resistance of the ceramics can be improved if an undercoating 850 (FIG. 40) is first applied. Examples of the undercoating 850 are Ni—Cr, SUS316, Cr—Mo. Thermal spray coating may make the material porous, and a sealing coating 860 (FIGS. 39 and 40) can be used to close the holes.

The coating process will now be described in greater detail with reference to FIGS. 35-38. Since the temperature of flame spray coating is generally too low to spray ceramics or high melting point metals, plasma spray coating is the preferred application.

Figure 35:
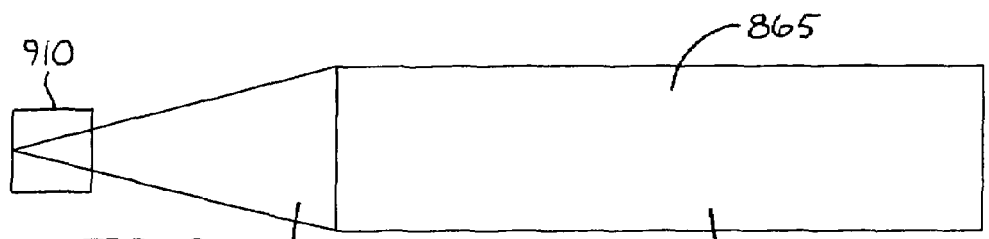
FIGS. 35-38 are stylized views showing successive spray coating steps of the present invention.

A soldering iron tip is provided shown in FIG. 35 at 865 (and can be constructed and configured as described elsewhere in this disclosure). It has a copper or copper alloy core 880 having a base portion 870 and a forwardly-extending portion 880. The tip end of the forwardly-extending portion 880 can have a MIM cap as described elsewhere in detail in this disclosure or iron plating. The soldering iron tip 870 is first cleaned by degreasing, that is taking oil off its surface using acetone and/or a degreasing agent. The working end tip is then masked with a mask, such as a heat-resistant rubber mask as shown by the blocks 910 at the left ends of FIGS. 35-38. The mask 910 covers the portion of the soldering iron tip that is not to be sprayed. It for example may not cover the entire MIM cap as can be understood from FIG. 1 so that the coating extends onto an aft portion of the cap.

Figure 36:
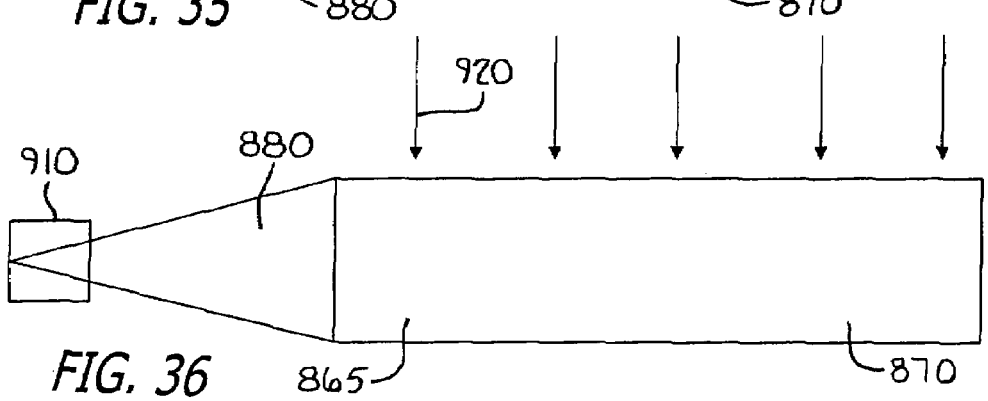
Figure 37:
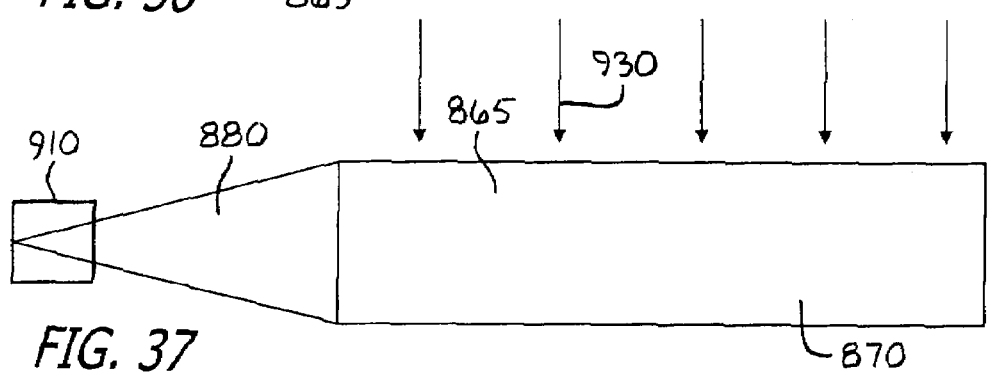

The surface of the soldering iron tip 870 is then roughened using steel grit blasting as shown by arrows 920 in FIG. 36. The diameters of the steel grit particles are approximately 10-250 μm, preferably with an average of 80 μm and having a 10 Morse hardness. The output of the blast machine can be approximately between 3.7 to 4.0 $kgf/cm^2$, and the steel grit particle blast can be for about ten seconds. After the blast, the surface on the soldering iron tip is cleaned to purge the steel from the surface since if steel is left on the surface the surface can rust. The cleaning can be done by jet air blasts as depicted by arrows 930 in FIG. 37.

Figure 38:
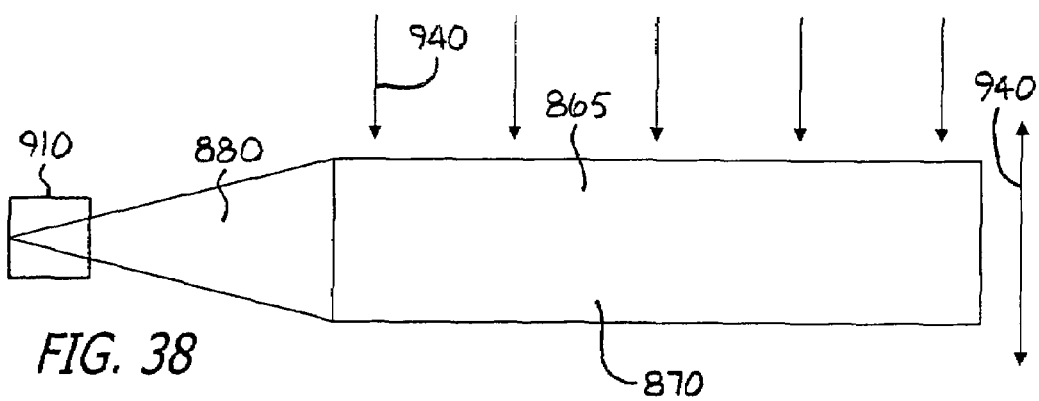

To apply the plasma spray coating 936, the soldering iron tip is installed on a spinning machine and is spun at a rate of between 50 and 500 rpm, as depicted by arrow 940 in FIG. 38. The injection nozzle for the sprayed material is positioned about one hundred millimeters from the spinning soldering iron tip. The temperature of the inside of the injection nozzle reaches' 1,000 to 10,000 degrees Centigrade. The spraying is done for about three cycles traveling right and then traveling back to the left from one edge of the base soldering iron tip core to the other. For example, when SUS316L is used as a spray coating material, the base material would have a 20 μm layer of SUS316L deposited for each cycle.

An undercoating 850 (see FIG. 40) can be applied to the surface of the base material to provide a stronger adhesion of the plasma-sprayed top coating material. If ceramic material 840 is sprayed on the metal (copper) base material, the adhesion to the metal surface of the base material can be weak. This is especially true if the product used for the ceramic top coating is used under high temperatures (such as a soldering) and may cause exfoliation because of the difference of the expansion rate against the heat. Therefore, the material used for the undercoating 850 should have an expansion rate which is between that of the top coating (e.g., 840) and that of the base material (e.g., copper). Ni-20% Cr can be used for the undercoating material. Alternative materials which can be used for heat resistance undercoating are (1) Ni, Co23%, Cr17%, Al2%, Y0.5% and (2) Co, Ni32%, Cr21%, Al8%, Y0.5%. The undercoating 850 can be applied using the same technique as that for the top coating as described above.

Flame spray coating or plasma spray coating of a material may cause the sprayed material to be porous. To close or cover the holes specific coating agents can be used herein, as shown in FIGS. 39 and 40 as sealant 860. Examples are $SiO_2$ and $ZrO_2$, and they can be hardened by heating them at 180° C. for thirty minutes.

In addition to SUS316 and Mo, Al, Ni, Cu, W, Ti perform well as the coated metal material 830. The workable metals should be durable as to chlorine flux, not eaten away by tin solder and be capable of being plated without any gaps between the soldered tip and the plated material. The material also should not have wettability as to solder. Materials such as SUS316 and Ti have a strong oxidation film on their surface. Therefore, these materials do not make metallic compounds with the tin of the solder because of no wettability. These types of metals can be used as the material of the film having no wettability. All ceramics do not have wettability with solder. However, metals are superior to ceramics at the point of adhesion to the copper base material.

As mentioned above, ceramics 840 advantageously do not have wettability with solder, but they do not adhere well to the base metal material. To solve this problem, the undercoating 850 can be applied, as mentioned above, and as shown in FIG. 40. The following materials can be used as the undercoating 850:

| Material | Melting Point Degrees (Cent.) |
|---|---|
| $Al_2O_3$—2.5% $TiO_2$ | 1855 |
| 70% $Al_2O_3$—29% MgO | 2135 |
| $Cr_2O_3$ | 2265 |
| 62% CaO—33% $SiO_2$ | 1900 |
| Al | 650 |
| Ni | 1456 |
| Cu | 1083 |
| Mo | 2622 |
| W | 3382 |
| Ti | 1820 |

Thermal Barrier Coating the Cavity

The copper or copper alloy soldering iron tip typically has a base portion having a rearwardly-opening cavity 109, as described earlier in detail and as depicted in FIG. 1. The cavity 109 is shaped and adapted to receive therein the bar-shaped ceramic heater 150, but a thin air layer results between the ceramic heater and the surface of the copper cavity. Thereby oxide scales of CuO or $Cu_2O$ typically result, heat conduction is reduced, and short circuiting or other problems can result. In the past, a thin stainless steel insert pipe has been placed in the cavity between the copper core of the soldering iron tip and the ceramic heater to provide for precise temperature control. However, this does not prevent the oxidation of the copper base material or copper. Further, the stainless steel pipe has poor heat conductivity and shields the conduction of heat and thus results in a slower response of the temperature sensor of the soldering iron.

Directed to solving these problems and pursuant to one aspect of the present invention, a paste which includes Al and Ag particles is applied in the cavity 109 and then the paste is heated to form an Ag—Al—Cu alloy coating layer 950 (108) in the cavity, as shown in FIG. 41. The paste can include a 10-60 weight % Al particles and 40-90 weight % Ag particles. The paste can include a binder such as alcohol. The alcohol can be methyl alcohol, ethyl alcohol, butyl alcohol, isopropyl alcohol, or any other higher alcohol available as a solvent in an amount to provide suitable viscosity to the paste. Further, glycerine or propylene glycol can be added as desired. The paste, for example, can be a mixture of 30% Al particles and 70% Ag particles. The particles can have diameters of between 1 μm and 50 μm, and can have an oxygen content of 1% by weight or less.

The paste is applied to the entire or substantially the entire surface of the rearwardly-opening cavity 109 of the soldering iron tip by brushing the paste or dipping the soldering iron tip into the paste. Preferably, a two to five mg/cm$^2$ layer of the paste is applied to the cavity surfaces. The paste is allowed to dry at a temperature less than 400° C.

The dried paste is then heated in an inert atmosphere and at a temperature and for a period of time sufficient to melt the paste. The temperature can be under 750° C. or preferably approximately 700° C., and the period of time is generally ten minutes. An Ag—Al—Cu alloy coating layer 950 is thereby formed on the entire surface of the cavity 109 or at least a substantial portion thereof. The alloy can be a eutectic composition of Ag-29.5% Al (by weight percent) and having a eutectic temperature of 566° C. The coating layer 950 can have a thickness of between 5 and 50 μm or preferably a thickness of approximately 40 μm. The coating layer 950 will have a high Al concentration wherein the Al concentration can be more than 5% by weight. Referring to FIG. 41, the coating layer can have a hardened $Al_2O_3$ surface film 960.

This thermal barrier coating 950 in the rearwardly-opening cavity 109 can be formed at the same time or after MIM cap is joined to the forward working-end portion of the soldering iron tip. The thermal barrier coating layer 950 can also be used for soldering iron tip constructions which do not use a MIM cap. Additionally, the forward working-end portion can have any shape such as a conical shape, a screwdriver shape, or a knife shape, not only for the soldering iron tip 100 but for any disclosed herein. The plasma spray coating (FIGS. 35-38) discussed above can be after the thermal barrier coating procedure.

From the foregoing detailed description, it will be evident that there are a number of changes, adaptations and modifications of the present invention which come within the province of those skilled in the art. The scope of the invention includes any combination of the elements from the different species or embodiments disclosed herein, as well as subassemblies, assemblies, and methods thereof. However, it is intended that all such variations not departing from the spirit of the invention be considered as within the scope thereof.

What is claimed is:

1. A method of making a soldering iron tip with a metal particle sintered member, comprising: forming the metal particle sintered member from a sintering base material, wherein the weight content of the sintering base material in the metal particle sintered member is between 60% and 99.99% by weight, wherein the sintering base material includes at least one of iron particles, nickel particles, and cobalt particles; and joining the metal particle sintered member to a copper or copper alloy core.

2. The method of claim 1, wherein forming the metal particle sintered member includes:
    mixing a sintering base material or a sintering base material and sintering additive with a binder;
    shaping the green compact by the metal injection molding; and sintering.

3. The method of claim 2, further comprising providing the copper or copper alloy core having a base portion and a forward extension portion, the forward tip portion having a tip end; wherein joining the metal particle sintered member to the copper or copper alloy core includes:
    applying Ag particles to at least one of an inside surface of the metal particle sintered member and the forward tip portion;
    after the applying, fitting the metal particle sintered member on the forward tip portion; and
    after the fitting, brazing the metal particle sintered member to the forward tip portion.

4. The method of claim 3 wherein the applying Ag particles includes applying the particles in a paste which includes alcohol.

5. The method of claim 4 wherein the applying includes each of the Ag particles having a size of between 0.1 and 50 micrometers.

6. The method of claim 4 where the applying includes brushing the paste onto the inside surface and the forward tip portion.

7. The method of claim 4, wherein the paste includes Ag particles and no other metal particles.

8. The method of claim 4, wherein the paste has a melting temperature equivalent to the melting temperature of silver.

9. The method of claim 3 wherein the brazing is in a furnace.

10. The method of claim 9 wherein the furnace is filled with nitrogen gas and has a brazing temperature of 700° C.

11. The method of claim 3 further comprising before the brazing and the fitting, mounting a brazing filler metal ring to the forward extension portion.

12. The method of claim 11 wherein the ring is a BAg-7 ring.

13. The method of claim 3 further comprising applying flux to a joint between the metal particle sintered member and the forward extension portion.

14. The method of claim 13 wherein the flux applying is before the brazing.

15. The method of claim 13 wherein the flux is a silver brazing flux.

16. The method of claim 3 wherein the brazing is in a non-oxidation atmosphere.

17. The method of claim 3 wherein the cap is an iron cap.

18. The method of claim 3 wherein the forward extension portion has a longitudinal through-passageway, and the soldering iron tip defines a desoldering iron tip.

19. A soldering iron tip formed by the method of claim 3.

20. The method of claim 2, wherein joining the metal particle sintered member to the copper or copper alloy core includes: applying a paste of Ag particles to at least one of an inside surface of the metal particle sintered member or a forward tip of an extension member of a soldering iron tip core; after the applying, inserting the metal particle sintered member on the forward tip end; and after the applying, subjecting the metal particle sintered member and the extension member to a brazing temperature.

21. The method of claim 20 wherein the applying includes applying approximately 500 grams of Ag particles.

22. The method of claim 20 wherein forming the metal particle sintered member includes metal injection molding the base material into a cap.

23. The method of claim 20 wherein the metal particle sintered member is an iron cap.

24. The method of claim 20 wherein the diameters of the Ag particles are between 0.1 and 50 micrometers.

25. The method of claim 20 further comprising before the subjecting, mounting a brazing filler metal ring on the extension member.

26. The method of claim 25 wherein the mounting is before the inserting.

27. The method of claim 25 wherein the mounting is against an abutment surface of the extension member.

28. The method of claim 27 wherein the abutment surface extends out perpendicular to a longitudinal axis of the extension member.

29. The method of claim 27 wherein the abutment surface extends out an angle from a longitudinal axis of the extension member away from the forward tip.

30. The method of claim 25 wherein the ring is a silver braze ring.

31. The method of claim 25 further comprising after the mounting, applying flux over the ring.

32. The method of claim 31 wherein the applying flux is before the subjecting.

33. The method of claim 31 wherein the applying flux is after the subjecting.

34. The method of claim 31 wherein the flux is AWS 3A type or AWS 3B type flux.

35. The method of claim 20 wherein the subjecting is in a furnace and at approximately 700° C. for approximately 10 minutes.

36. The method of claim 35 where the furnace is filled with at least one of the gases selected from the group consisting essentially of Nitrogen gas, Hydrogen gas, and Argon gas.

37. The method of claim 20 further comprising applying flux to a joint between the metal particle sintered member and the extension member.

38. The method of claim 37 wherein the flux is a silver brazing flux.

39. The method of claim 20 wherein the applying includes applying the paste to both the inside surface and the forward tip end.

40. The method of claim 20 further comprising applying flux to the joint between the metal particle sintered member and the extension member, and the subjecting includes heating the metal particle sintered member and the extension member in an inert atmosphere.

41. The method of claim 20 wherein the inserting includes pressure fitting the metal particle sintered member on the forward tip end.

42. The method of claim 20 wherein the cap is an iron cap.

43. The method of claim 1, wherein the sintering base material does not include copper.

44. The method of claim 1, wherein the sintering base material is mostly iron.

45. The method of claim 1, wherein the sintering base material consists of one or a combination of iron, nickel, and cobalt.

46. The method of claim 1, wherein the sintering base material includes iron particles having a purity of no less than 95.5%.

* * * * *